US008027052B2

(12) United States Patent
Unno

(10) Patent No.: US 8,027,052 B2
(45) Date of Patent: Sep. 27, 2011

(54) PRINTING APPARATUS AND METHOD FOR CONTROLLING THE SAME

(75) Inventor: Kouichi Unno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1051 days.

(21) Appl. No.: 11/852,715

(22) Filed: Sep. 10, 2007

(65) Prior Publication Data

US 2008/0088869 A1 Apr. 17, 2008

(30) Foreign Application Priority Data

Oct. 13, 2006 (JP) ................................ 2006-280155

(51) Int. Cl.
*G06F 15/00* (2006.01)
*G06F 3/12* (2006.01)
*G06K 1/00* (2006.01)
*G06K 15/00* (2006.01)

(52) U.S. Cl. ...................................... 358/1.15; 358/1.18

(58) Field of Classification Search ................. 358/1.15, 358/1.18, 1.13, 1.14, 1.1
See application file for complete search history.

(56) References Cited

U.S. PATENT DOCUMENTS

2006/0210284 A1 9/2006 Mine et al.

FOREIGN PATENT DOCUMENTS

JP 2001180051 A * 7/2001
JP 2002-029120 A 1/2002
JP 2004-274144 A 9/2004

* cited by examiner

*Primary Examiner* — Douglas Tran
(74) *Attorney, Agent, or Firm* — Canon U.S.A., Inc. IP Division

(57) ABSTRACT

A printing apparatus includes a CPU that determines whether or not to use operation information included in paper information received from another printing apparatus. If it is determined to use the operation information, the received paper information is registered as the paper information of Type 2. In addition, the CPU included in the printing apparatus selects one of a plurality of pieces of paper information and controls a printer unit such that the printer unit performs a printing process in an operating state based on the operation information included in the selected piece of paper information.

19 Claims, 20 Drawing Sheets

FIG. 9

| ID | Paper Name | Type | Shape | grammage | Surface Nature | Fixing Temperature | Printing Speed | Transfer Voltage |
|---|---|---|---|---|---|---|---|---|
| 0001-0000 | Thin Paper | 1 | Normal | 70 $g/m^2$ | High Quality | 177°C | 240 mm/sec | 0.9 KV |
| 0002-0000 | Plain Paper | 1 | Normal | 90 $g/m^2$ | High Quality | 180°C | 240 mm/sec | 1.0 KV |
| 0003-0000 | Heavy Paper | 1 | Normal | 150 $g/m^2$ | High Quality | 182°C | 200 mm/sec | 1.1 KV |
| 0004-0000 | Recycled Paper | 1 | Normal | 90 $g/m^2$ | Recycled | 180°C | 240 mm/sec | 1.0 KV |
| 0005-0000 | Coated Paper 1 | 1 | Normal | 120 $g/m^2$ | Coated | 182°C | 200 mm/sec | 1.1 KV |
| 0006-0000 | Coated Paper 2 | 1 | Normal | 180 $g/m^2$ | Coated | 184°C | 180 mm/sec | 1.2 KV |
| 0007-0000 | Tab Paper 1 | 1 | Tab | 120 $g/m^2$ | High Quality | 182°C | 200 mm/sec | 1.1 KV |
| 0008-0000 | Tab Paper 2 | 1 | Tab | 180 $g/m^2$ | High Quality | 184°C | 180 mm/sec | 1.2 KV |

FIG. 10

| ID | Paper Name | Type | Shape | grammage | Surface Nature | Fixing Temperature | Printing Speed | Transfer Voltage |
|---|---|---|---|---|---|---|---|---|
| 0101-0000 | AAA Company Plain Paper | 3 | Normal | 90 g/m$^2$ | High Quality | 180°C | 240 mm/sec | 1.0 Kv |
| ⋮ | ⋮ | ⋮ | ⋮ | ⋮ | ⋮ | ⋮ | ⋮ | ⋮ |
| 0234-0000 | ABC Paper Coated High Grade 100 gsm | 3 | Normal | 100 g/m$^2$ | Coated | 187°C | 240 mm/sec | 1.0 KV |
| 0235-0000 | ABC Paper Coated High Grade 150 gsm | 3 | Normal | 150 g/m$^2$ | Coated | 189°C | 240 mm/sec | 1.0 KV |
| 0236-0000 | ABC Paper Coated High Grade 200 gsm | 3 | Normal | 200 g/m$^2$ | Coated | 191°C | 200 mm/sec | 1.2 KV |
| 0237-0000 | ABC Paper Coated High Grade 250 gsm | 3 | Normal | 250 g/m$^2$ | Coated | 192°C | 240 mm/sec | 1.2 KV |
| 0238-0000 | ABC Paper Label 170 gsm | 3 | Normal | 170 g/m$^2$ | Coated | 190°C | 200 mm/sec | 1.1 KV |
| 0239-0000 | DEF Company Recycled Paper 80 gsm | 3 | Normal | 80 g/m$^2$ | Recycled | 180°C | 180 mm/sec | 1.1 KV |
| 0240-0000 | DEF Company Recycled Paper 100 gsm | 3 | Normal | 100 g/m$^2$ | Recycled | 180°C | 200 mm/sec | 1.1 KV |
| 0241-0000 | DEF Company Recycled Paper 120 gsm | 3 | Normal | 120 g/m$^2$ | Recycled | 180°C | 180 mm/sec | 1.2 KV |
| ⋮ | ⋮ | ⋮ | ⋮ | ⋮ | ⋮ | ⋮ | ⋮ | ⋮ |
| 1100-0000 | ZZZ Company Plain Paper | 3 | Normal | 93 g/m$^2$ | High Quality | 180°C | 240 mm/sec | 1.0 KV |

FIG. 11

| ID | Paper Name | Type | Shape | grammage | Surface Nature | Fixing Temperature | Printing Speed | Transfer Voltage |
|---|---|---|---|---|---|---|---|---|
| 0002–0001 | Custom Plain Paper 1 | 2 | Normal | 95 g/m$^2$ | High Quality | 179°C | 240 mm/sec | 1.0 KV |
| 0002–0002 | Custom Plain Paper 2 | 2 | Normal | 93 g/m$^2$ | High Quality | 180°C | 240 mm/sec | 1.0 KV |
| 0236–0001 | ABC Coated 1 | 2 | Normal | 200 g/m$^2$ | Coated | 191°C | 200 mm/sec | 1.2 KV |
| 0236–0002 | ABC Coated 2 | 2 | Normal | 210 g/m$^2$ | Coated | 180°C | 200 mm/sec | 1.2 KV |
| 0237–0001 | ABC Coated 3 | 2 | Normal | 250 g/m$^2$ | Coated | 192°C | 240 mm/sec | 1.3 KV |
| 0300–0001 | Custom Tab Paper 1 | 2 | Tab | 120 g/m$^2$ | High Quality | 185°C | 200 mm/sec | 1.1 KV |

| Paper Feed Tray | Paper ID |
|---|---|
| Cassette 311 | 0001-0000 |
| Cassette 312 | 0002-0000 |
| Cassette 313 | 0002-0001 |
| Cassette 314 | 0236-0002 |
| Stack Bypass Tray 315 | 0002-0002 |

FIG. 18

| Shape | Surface Nature | grammage | Fixing Temperature | Printing Speed | Transfer Voltage |
|---|---|---|---|---|---|
| Normal | High Quality | 60 — 80 g/m$^2$ | 180°C | 240 mm/sec | 1.0 KV |
| | | 81 — 100 g/m$^2$ | 185°C | 220 mm/sec | 1.1 KV |
| | | 101 — 200 g/m$^2$ | 190°C | 200 mm/sec | 1.2 KV |
| | Recycled | 60 — 80 g/m$^2$ | 180°C | 220 mm/sec | 1.0 KV |
| | | 81 — 100 g/m$^2$ | 185°C | 200 mm/sec | 1.1 KV |
| | | 101 — 200 g/m$^2$ | 190°C | 180 mm/sec | 1.2 KV |
| | Coated | 60 — 80 g/m$^2$ | 185°C | 220 mm/sec | 1.1 KV |
| | | 81 — 100 g/m$^2$ | 190°C | 200 mm/sec | 1.2 KV |
| | | 101 — 200 g/m$^2$ | 195°C | 180 mm/sec | 1.3 KV |
| Tab | High Quality | 60 — 80 g/m$^2$ | 180°C | 240 mm/sec | 1.0 KV |
| | | 81 — 100 g/m$^2$ | 185°C | 220 mm/sec | 1.1 KV |
| | | 101 — 200 g/m$^2$ | 190°C | 200 mm/sec | 1.2 KV |
| | Recycled | 60 — 80 g/m$^2$ | 180°C | 220 mm/sec | 1.0 KV |
| | | 81 — 100 g/m$^2$ | 185°C | 200 mm/sec | 1.1 KV |
| | | 101 — 200 g/m$^2$ | 190°C | 180 mm/sec | 1.2 KV |
| | Coated | 60 — 80 g/m$^2$ | 185°C | 220 mm/sec | 1.1 KV |
| | | 81 — 100 g/m$^2$ | 190°C | 200 mm/sec | 1.2 KV |
| | | 101 — 200 g/m$^2$ | 195°C | 180 mm/sec | 1.3 KV |

FIG. 19

| Paper Name | Shape | Surface Nature | grammage | Fixing Temperature | Printing Speed | Transfer Voltage |
|---|---|---|---|---|---|---|
| SSS Company Plain Paper | Normal | High Quality | 90 g/m$^2$ | 180°C | 240 mm/sec | 1.0 KV |
| SSS Company Heavy Paper | Normal | High Quality | 230 g/m$^2$ | 190°C | 180 mm/sec | 1.2 KV |
| SSS Company Tab Paper | Tab | Coated | 180 g/m$^2$ | 190°C | 185 mm/sec | 1.3 KV |

FIG. 20

| Shape | Surface Nature | grammage | Corresponding Paper of Type 1 |
|---|---|---|---|
| Normal | High Quality | 60 — 80 g/m$^2$ | Thin Paper |
| | | 81 — 100 g/m$^2$ | Plain Paper |
| | | 101 — 200 g/m$^2$ | Heavy Paper |
| | Recycled | 60 — 80 g/m$^2$ | Thin Paper |
| | | 81 — 100 g/m$^2$ | Recycled Paper |
| | | 101 — 200 g/m$^2$ | Heavy Paper |
| | Coated | 60 — 80 g/m$^2$ | Thin Paper |
| | | 81 — 100 g/m$^2$ | Coated Paper 1 |
| | | 101 — 200 g/m$^2$ | Coated Paper 2 |
| Tab | High Quality | 60 — 80 g/m$^2$ | Thin Paper |
| | | 81 — 100 g/m$^2$ | Tab Paper 1 |
| | | 101 — 200 g/m$^2$ | Tab Paper 2 |
| | Recycled | 60 — 80 g/m$^2$ | Thin Paper |
| | | 81 — 100 g/m$^2$ | Tab Paper 1 |
| | | 101 — 200 g/m$^2$ | Tab Paper 2 |
| | Coated | 60 — 80 g/m$^2$ | Thin Paper |
| | | 81 — 100 g/m$^2$ | Coated Paper 1 |
| | | 101 — 200 g/m$^2$ | Coated Paper 2 |

PRINTING APPARATUS AND METHOD FOR CONTROLLING THE SAME

BACKGROUND OF THE INVENTION

1. Field of the Invention

The present invention relates to a printing apparatus and a method for controlling the printing apparatus.

2. Description of the Related Art

Printing apparatuses that perform a process of printing on sheets (paper sheets) are known. Various kinds of sheets are used in the printing process, and are classified by, for example, size, thickness, weight per unit area (hereinafter called grammage), quality (surface smoothness), etc., thereof. The printing apparatuses are demanded to print images with a uniform appearance irrespective of the kind of sheets on which the images are printed in the printing process. To satisfy this demand, a printing apparatus has been proposed which changes an operating state in the printing process in accordance with the kind of the sheet so as to make the appearance of the printed images uniform irrespective of the kind of sheets used in the printing process. When, for example, the printing apparatus is an electrophotographic printer, the operating state of the printing apparatus includes the settings of a pressing force and a fixing temperature applied to fix a developing-agent image on a sheet, a transfer voltage applied to transfer the developing-agent image onto the sheet, etc.

As a method for changing the operating state of the printing apparatus in accordance with the kind of the sheet being used, a method is known in which information for setting the operating state of the printing apparatus (hereinafter called operation information) is stored in the printing apparatus in association with the kind of sheet in advance. In addition, a method in which the operation information is generated by a host computer and is stored in the printing apparatus is also known (refer to, for example, Japanese Patent Laid-Open No. 2002-29120).

On the other hand, a system including a plurality of printing apparatuses for printing images on sheets has recently become popular. In such a system, the appearances of images printed in printing processes performed by different printing apparatuses can be nonuniform. This becomes a problem when, for example, a plurality of printing apparatuses perform printing processes using the same document data. More specifically, there may be a case in which sheets having images printed thereon using a plurality of printing apparatus are collected and delivered to a single client. In such a case, there is a risk that sheets having different appearances will be delivered. This problem can be solved by, for example, operating the printing apparatuses so as to adjust the operating states thereof such that images having a uniform appearance can be obtained in the printing processes performed individually by the printing apparatuses. However, when, for example, the appearance of an image printed on a sheet by a certain printing apparatus is to be matched with the appearance of an image printed on a sheet by another printing apparatus, a cumbersome task is required for setting the other printing apparatus. Therefore, to reduce the cumbersome task, a method of transmitting the operation information from a certain printing apparatus to another printing apparatus and matching the operating states of the two printing apparatuses can be used.

However, when the operation information is simply transmitted from one printing apparatus to another printing apparatus, the following problem occurs. That is, depending on the printing apparatus that receives paper information including the operation information, a failure occurs when the operation information included in the paper information is used. For example, if the kind of the printing apparatus that transmits the paper information is different from the kind of the printing apparatus that receives the paper information, a failure can occur in a printing process using the operation information included in the received paper information. Such a failure occurs when, for example, a fixing temperature indicated by the operation information included in the paper information cannot be set in the printing apparatus that received the paper information.

SUMMARY OF THE INVENTION

In light of the above-described problem, the present invention is directed to an improved printing apparatus and a method for controlling the printing apparatus.

The present invention provides a printing apparatus and a method for controlling the printing apparatus in which, when the printing apparatus receives paper information including operation information for setting an operating state of a printing unit from another printing apparatus, the paper information is registered after suitably determining whether or not to use the operation information on the basis of apparatus information for identifying the printing apparatus from which the paper information is received.

In addition, the present invention also provides a printing apparatus and a method for controlling the printing apparatus in which one of a first transmission process a second transmission process is performed. In the first transmission process, the printing apparatus transmits paper information including both characteristic information representing characteristics of paper and operation information to another printing apparatus. In the second transmission process, the printing apparatus transmits paper information that includes only the characteristic information and that does not include the operation information to another printing apparatus.

Further features of the present invention will become apparent from the following description of exemplary embodiments with reference to the attached drawings.

As many apparently widely different embodiments of the present invention can be made without departing from the spirit and scope thereof, it is to be understood that the invention is not limited to the specific embodiments thereof except as defined in the appended claims.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 9 is a diagram illustrating paper information of Type 1.

FIG. 10 is a diagram illustrating paper information of Type 3.

FIG. 11 is a diagram illustrating paper information of Type 2.

FIG. 18 shows a paper-information determination table.

FIG. 19 is a diagram illustrating an example of paper information.

FIG. 20 shows another paper-information determination table.

DESCRIPTION OF THE EMBODIMENTS

Figure 1:
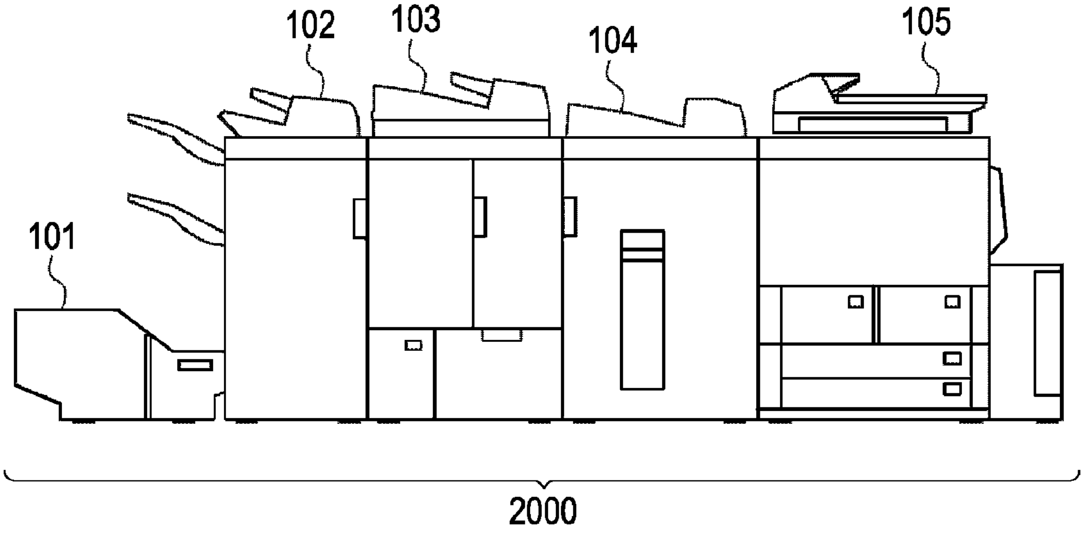
FIG. 1 is a diagram illustrating the overall structure of a printing system.

The present invention will now be described in detail with reference to the drawings showing a various embodiment thereof. In the drawings, elements and parts which are identical throughout the views are designated by identical reference numerals, and duplicate description thereof is omitted.

First Exemplary Embodiment

Overall Structure of Printing System (Printing Apparatus)

FIG. 1 is a diagram illustrating the overall structure of a Bookbinding system 2000 according to a first embodiment of the present invention.

In FIG. 1, a printing apparatus 105 performs a printing process of printing an image on a sheet on the basis of print data, and then conveys the sheet to a stacker device 104. The stacker device 104 stacks the sheet conveyed from the printing apparatus 105 on a stack tray (not shown). The stacker device 104 can also convey the sheet from the printing apparatus 105 to a case-binding device 103 instead of stacking the sheet on the stack tray. The case-binding device 103 places a plurality of sheets S conveyed from the printing apparatus 105 through the stacker device 104 on a sheet tray as a sheet stack. A case-bound book is obtained by covering the sheet stack placed on the sheet tray with a cover sheet placed on a cover sheet tray.

The case-binding device 103 can also convey the sheet S from the stacker device 104 to a saddle-stitching device 102 without placing the sheet S on the sheet tray. The saddle-stitching device 102 performs a stapling process of a sheet stack S1 including a plurality of sheets S conveyed from the printing apparatus 105 through the case-binding device 103. Thus, a saddle-stitched book is obtained. The saddle-stitched book formed by the saddle-stitching device 102 is conveyed to a cutting device 101, where a cutting process is performed.

Control Structure of Printing Apparatus

Figure 2:
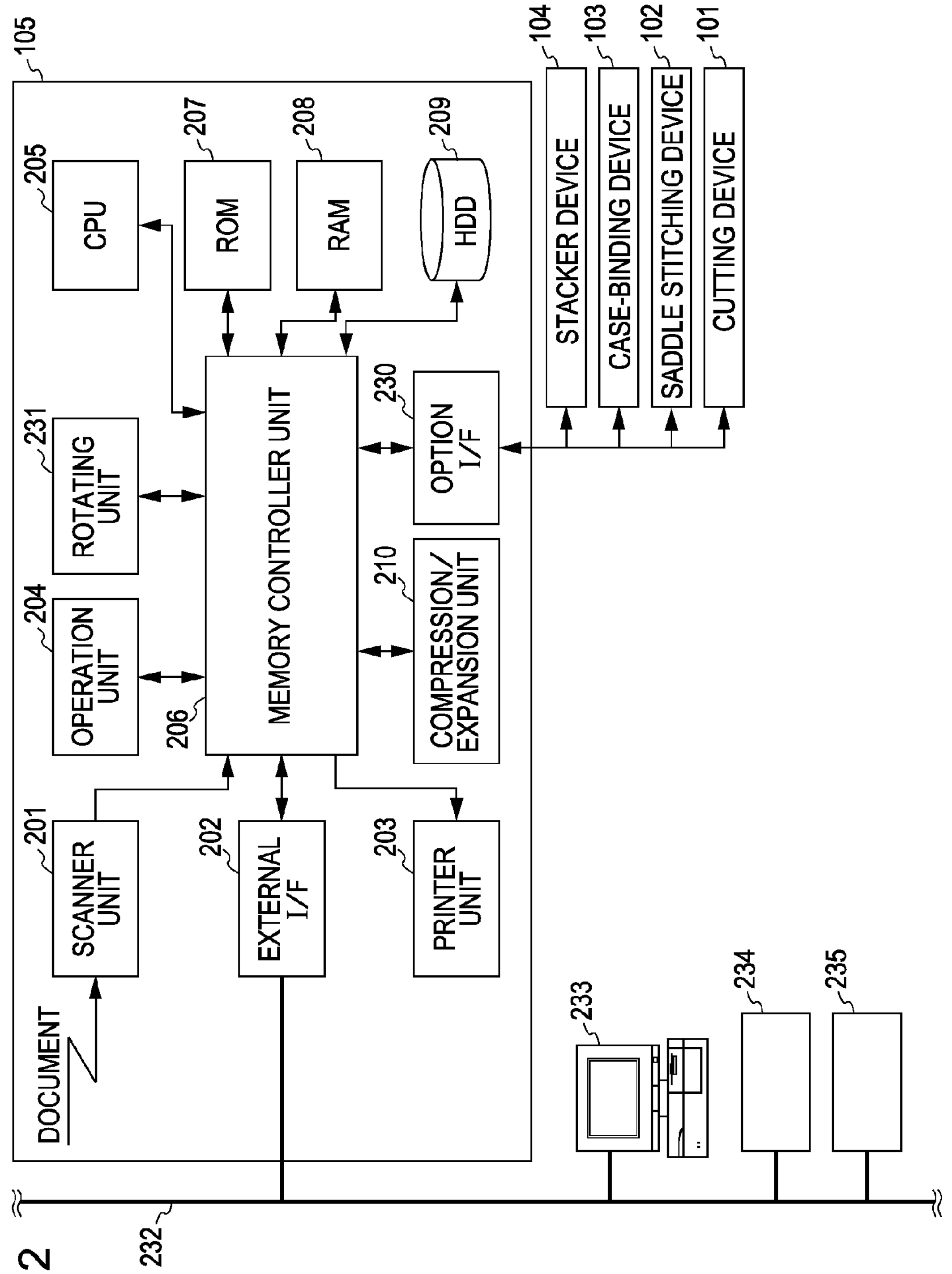
FIG. 2 is a block diagram illustrating the control structure of the printing apparatus.

FIG. 2 is a block diagram illustrating the control structure of the printing apparatus 105 according to the first embodiment of the present invention.

Referring to FIG. 2, a scanner unit 201 optically reads an original document having a plurality of pages (sheets of paper or the like having images printed thereon) and generates image data. Then, the scanner unit 201 performs image processing (for example, a shading correction process) of the obtained image data. Then, the scanner unit 201 stores the image data of the plurality of pages obtained as a result of image processing in a hard disk (HDD) 209 as a single print job (print data). An external I/F 202 receives a print job including image data of a plurality of pages from a computer terminal 233 that functions as an external device connected to the printing apparatus 105 via a network 232. The external I/F 202 stores the received print job in the hard disk 209. The external I/F 202 is also used for communication with a printing apparatus 234 and a printing apparatus 235. The printing apparatus 234 has a structure similar to that of the printing apparatus 105. The printing apparatus 235 has a structure different from that of the printing apparatus 105. The printing apparatus 105 differs from the printing apparatus 235 in the structure of a printer unit 203, and other structures of the printing apparatus 105 are similar to those of the printing apparatus 235. The printer unit 203 of the printing apparatus 105 differs from that of the printing apparatus 235 in the structures of a fixing device 327 and a transfer device 325, which will be described below in connection with FIG. 3. The printer unit 203 performs a printing process of printing images on a plurality of sheets (paper sheets) on the basis of the print job stored in the hard disk 209. The print job includes the image data of a plurality of pages. Therefore, a plurality of images represented by the image data are printed on the respective sheets in the printing process. An operation unit 204 receives various commands from a user of the printing apparatus 105 and transmits the received commands to a memory controller unit 206. Thus, various settings are made in the printing apparatus 105.

A CPU 205 reads a program from a ROM 207 and writes the program into a RAM 208. The overall operation of a bookbinding system 2000 including the printing apparatus 105 is controlled by executing the program using the RAM 208. The ROM 207 stores a program for interpreting page description language (PDL) code data received by the external I/F 202 as a print job from the external device. The ROM 207 also stores a program for generating data with which the printer unit 203 can perform printing after the PDL code data is interpreted. The memory controller unit 206 controls access to the ROM 207, the RAM 208, and the hard disk 209 from other units.

A compression/expansion unit 210 compresses the image data stored in the RAM 208 or the hard disk 209 using any of various compressing methods, such as JBIG and JPEG. In addition, the compression/expansion unit 210 expands the image data compressed by any of the various compressing methods.

A rotating unit 231 performs a rotating process if the image data transmitted from the hard disk 209 to the printer unit 203 is to be rotated in the printing process thereof. In the rotating process performed by the rotating unit 231, the image data can be rotated by an arbitrary angle, such as 90° or 180° for inverting the image data. The rotating angle by which the image data is rotated in the rotating process performed by the rotating unit 231 can be set by the CPU 205.

An option I/F 230 provides communication between the CPU 205 and each of the option devices, such as the stacker device 104, the case-binding device 103, the saddle-stitching device 102, and the cutting device 101, which are optionally connected to the printing apparatus 105. Each of the stacker device 104, the case-binding device 103, the saddle-stitching device 102, and the cutting device 101 has a CPU (not shown) for controlling the inner operation thereof. The CPU 205 of the printing apparatus 105 controls the stacker device 104, the case-binding device 103, the saddle-stitching device 102, and the cutting device 101 by transmitting control commands for controlling the CPUs included in the option devices via the option I/F 230.

Structure of Printing Apparatus

Figure 3:
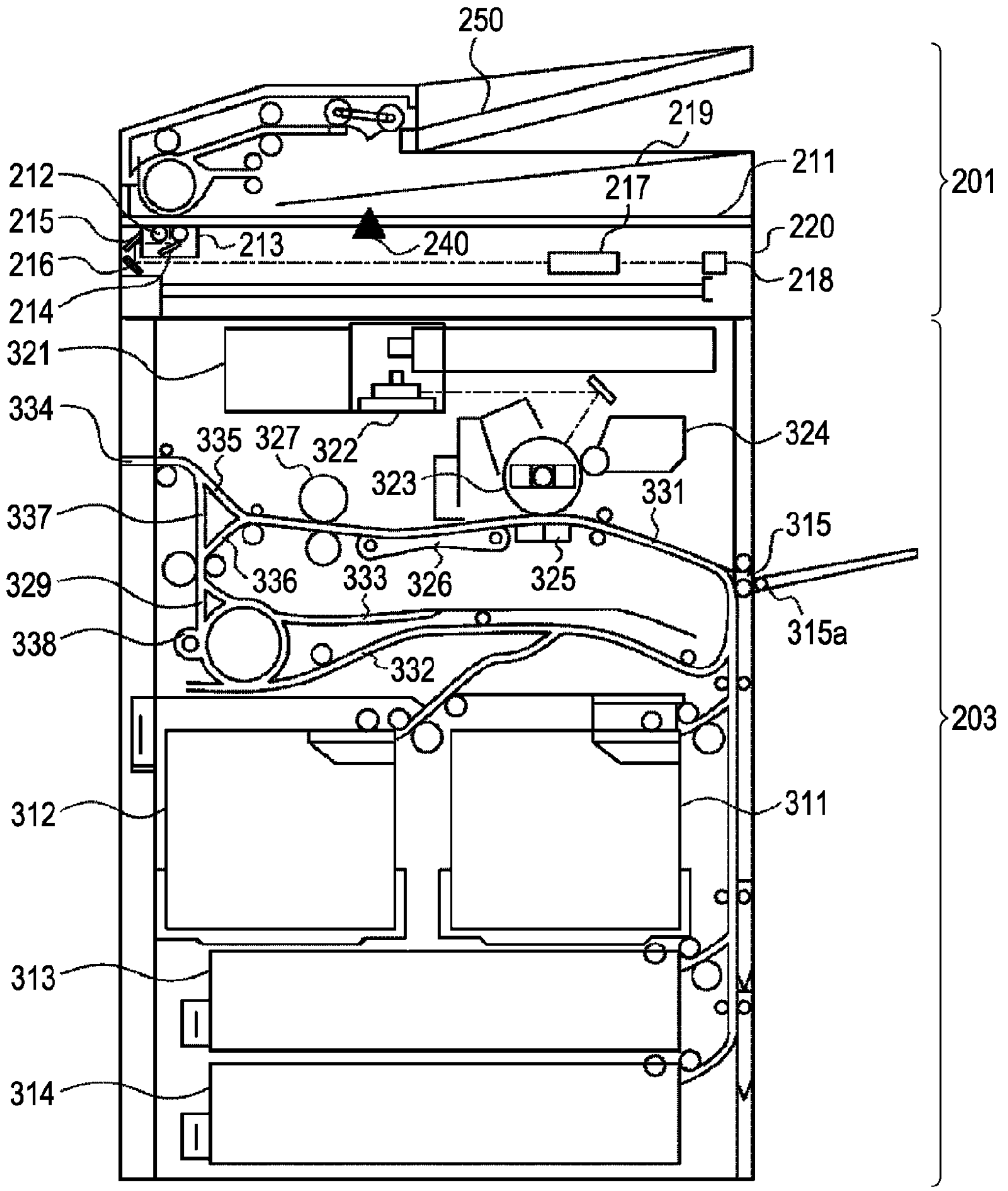
FIG. 3 is a diagram illustrating the structure of the printing apparatus.

The structure of the printing apparatus 105 will be described below with reference to FIG. 3.

The printing apparatus 105 basically includes the scanner unit 201 and the printer unit 203. In the scanner unit 201, sheets stacked on a document feeder unit 250 are fed to a platen glass 211 one at a time from the sheet at the top in the order in which the sheets are stacked. After the scanner unit 220 scans the sheets, the document feeder unit 250 ejects the sheets onto an output tray 219. When a document sheet is conveyed to the platen glass 211, the scanner unit 201 turns on a lamp 212 and starts moving an optical unit 213, thereby scanning the document sheet while illuminating the document sheet from below. Light reflected by the document sheet is guided to a CCD image sensor (hereinafter called a CCD) 218 through a plurality of mirrors 214, 215, and 216 and a lens 217. Accordingly, the image on the scanned document sheet is read by the CCD 218 as image data. The image data read by the CCD 218 is subjected to predetermined image processing, and is then stored in the hard disk 209.

In the printer unit 203, a laser beam corresponding to the image data read from the hard disk 209 is output from a laser emitter 322 driven by a laser driver 321. The laser beam is incident on a photosensitive drum 323, so that an electrostatic latent image corresponding to the laser beam is formed on the photosensitive drum 323. A developer 324 causes a developing agent (for example, toner) to adhere to the photosensitive drum 323 in areas corresponding to the electrostatic latent image.

In addition, at a timing synchronized with the start of irradiation of the laser beam, a sheet S (not shown) is fed from any one of cassettes 311 to 314 and a stack bypass tray 315 and is conveyed to the transfer device 325 through a conveying path 331. The stack bypass tray 315 is provided with a sheet detection sensor 315*a* that detects whether or not the sheet S is placed on the stack bypass tray 315. The transfer device 325 transfers the developing agent adhering to the photosensitive drum 323 onto the sheet S. The sheet S having the developing agent transferred thereon is conveyed to the fixing device 327 by a conveyor belt 326 and is heated by the fixing device 327. Accordingly, the developing agent is fixed on the sheet S. The sheet S having the developing agent fixed thereon is conveyed to the stacker device 104 through conveying paths 335 and 334. When the sheet S is to be turned upside down before reaching the stacker device 104, the CPU 205 controls the printer unit 203 such that the sheet S reaches conveying paths 336 and 338. Then, the sheet S is conveyed in the opposite direction along the conveying paths 337 and 334 to the stacker device 104.

Figure 6:
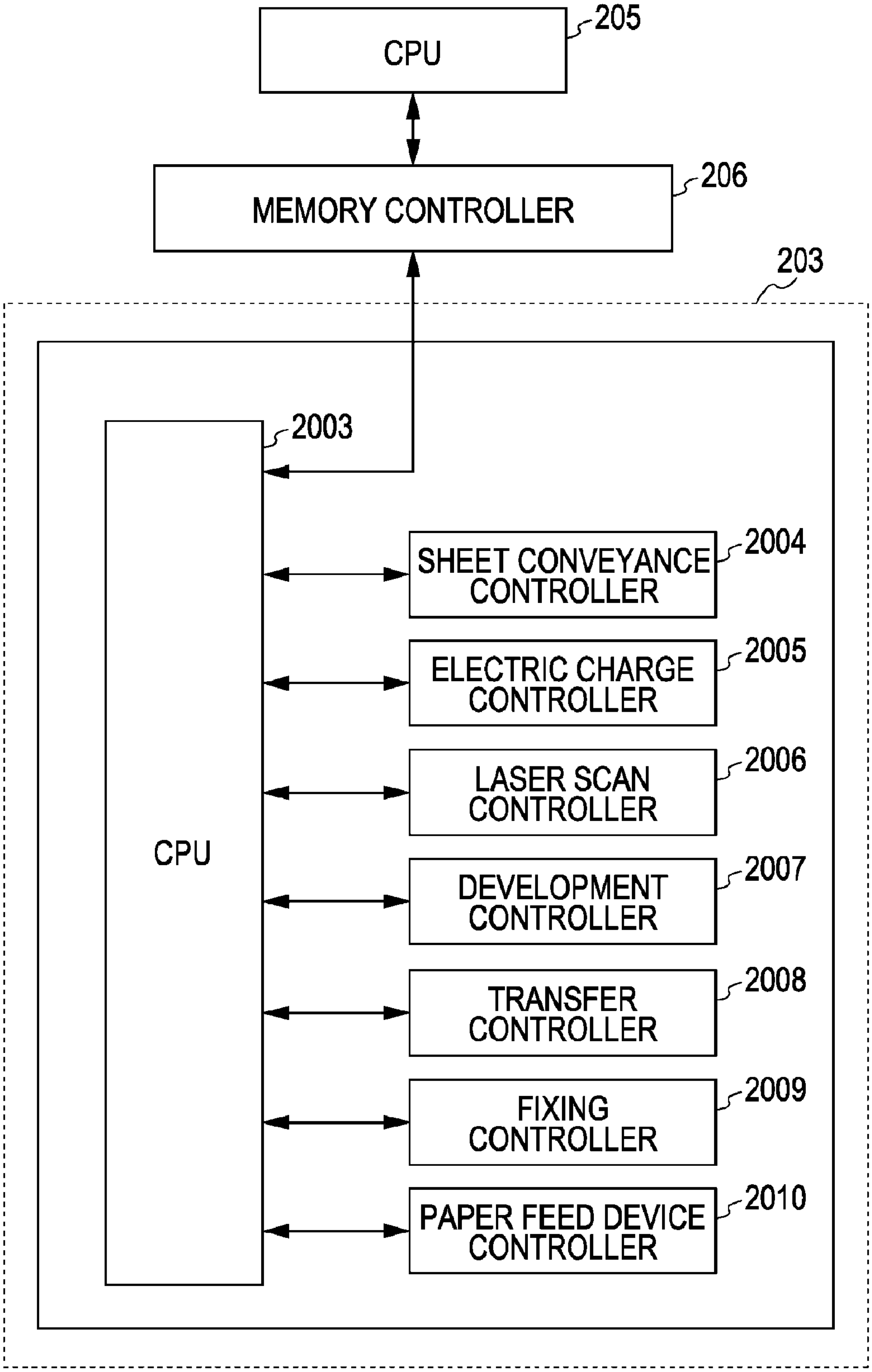
FIG. 6 is a diagram illustrating the control structure of a printer unit.

The control structure of the printer unit 203 according to the first embodiment will be described below with reference to FIG. 6.

The printer unit 203 included in the printing apparatus 105 is capable of mutually communicating with the CPU 205 through the memory controller unit 206. The printer unit 203 includes a CPU 2003 that receives the image data and commands for executing the printing process from the memory controller unit 206, converts the received image data into bit data by analyzing the image data, and analyzes the received commands.

The printer unit 203 also includes various control units controlled by the CPU 2003. The various control units include a sheet-conveyance controller 2004, an electric-charge controller 2005, a laser-scan controller 2006, a development controller 2007, a transfer controller 2008, a fixing controller 2009, and a paper-feed-device controller 2010. The sheet-conveyance controller 2004 controls various rollers included in the printing apparatus 105 for conveying the sheet S. The electric charge controller 2005 applies a voltage to a charge roller for charging the photosensitive drum 323 to a predetermined potential. The laser-scan controller 2006 controls the operation of scanning the surface of the photosensitive drum 323 with the laser beam on the basis of the image data received by the CPU 205 from the memory controller unit 206. The development controller 2007 controls the developer 324 for developing the electrostatic latent image formed on the surface of the photosensitive drum 323. The transfer controller 2008 controls a transfer voltage applied to the transfer device 325 for transferring the toner image (developing-agent image) formed on the photosensitive drum 323 onto the sheet S. The fixing controller 2009 controls rotation of a pair of rollers included in the fixing device 327 and electric power supplied to a heater provided on at least one of the rollers so as to fix the toner image that is transferred onto the sheet S. The paper-feed-device controller 2010 controls the operation of driving rollers included in the cassettes 311 to 314 so as to feed the sheet S to the printing section.

Structure of Operation Unit

The structure of the operation unit 204 included in the printing apparatus 105 will be described below with reference to FIG. 4.

The operation unit 204 has a hard key group 4-240 including various hard keys 4-241 to 4-246. In addition, the operation unit 204 also has a liquid crystal display 4-250 formed of a dot matrix of a liquid crystal display device. The liquid crystal display 4-250 has a touch panel on the surface thereof. The operation unit 204 detects a key input when the user of the printing apparatus 105 presses a key display element, and transmits a signal corresponding to the key input to the CPU 205. The CPU 205 executes an operation corresponding to the received signal by controlling the printing apparatus 105 on the basis of the program stored in the ROM 207.

The key 4-243 is a power key used for turning on/off the power supply. The key 4-244 is a power save key for setting and canceling a power save mode. The key 4-241 is a start key for allowing the user to input a command for starting various processes, such as the process of reading the image on the original sheet by the scanner unit 201. The key 4-242 is a stop key for allowing the user to input a command for stopping the processes being performed by the bookbinding system 2000 including the printing apparatus 105.

The key group 4-245 includes ten keys numbered 0 to 9 for inputting the number of copies, a zoom ratio, etc., and a clear key for clearing the inputs of the ten keys. The number of copies input using the key unit 4-245 is displayed in a display field 4-253. The key 4-246 is a reset key used for returning the settings made by the user through the liquid crystal display 4-250 and the hard key group 4-240 to the initial settings.

The liquid crystal display 4-250 displays the operating state of the bookbinding system 2000 on the basis of the commands from the CPU 205. The liquid crystal display 4-250 also displays touch keys. More specifically, the liquid crystal display 4-250 displays a key 4-252 used for selecting a cassette on which the sheets S (paper) to be used by the printing apparatus 105 in the printing process are stacked. When this key is pressed by the user, the CPU 205 controls the operation unit 204 so as to display a paper select screen shown in FIG. 5A on the liquid crystal display 4-250.

Figure 4:
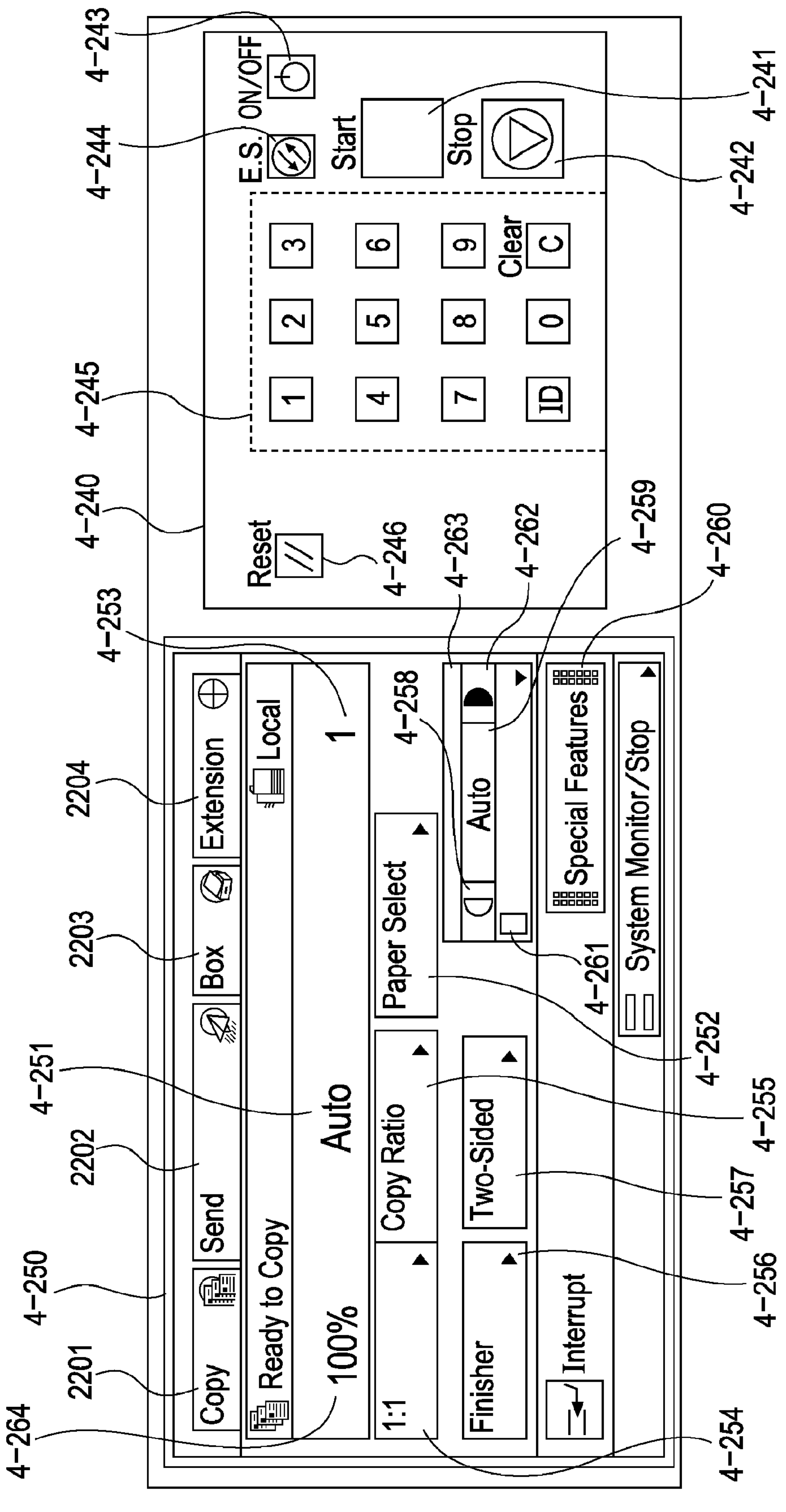
FIG. 4 is a diagram illustrating the structure of an operation unit.
Figure 5A:
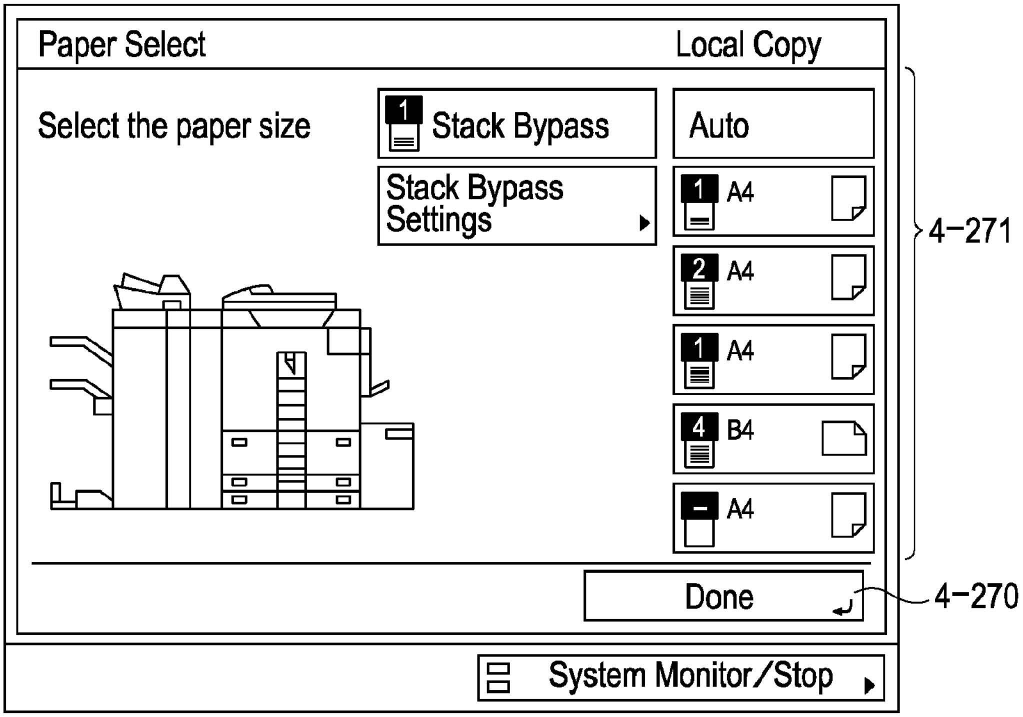
FIGS. 5A, 5B, and 5C are diagrams illustrating operation screens displayed on the operation unit.

Referring to the paper select screen shown in FIG. 5A, the cassette (one of the cassettes 311 to 315) to be used in the printing process is selected using a key group 4-271. Then, when a close key 4-270 is pressed by the user, the CPU 205 closes this screen, displays the screen shown in FIG. 4 again, and shows the selected cassette in a display field 4-251.

Keys 4-258 and 4-262 shown in FIG. 4 are used for adjusting density. The CPU 205 displays the density adjusted by these keys in a display field 4-263. A key 4-259 is used for turning on/off an automatic density adjustment function. A key 4-261 is used for setting a photographic mode, a text mode, etc.

Figure 5B:
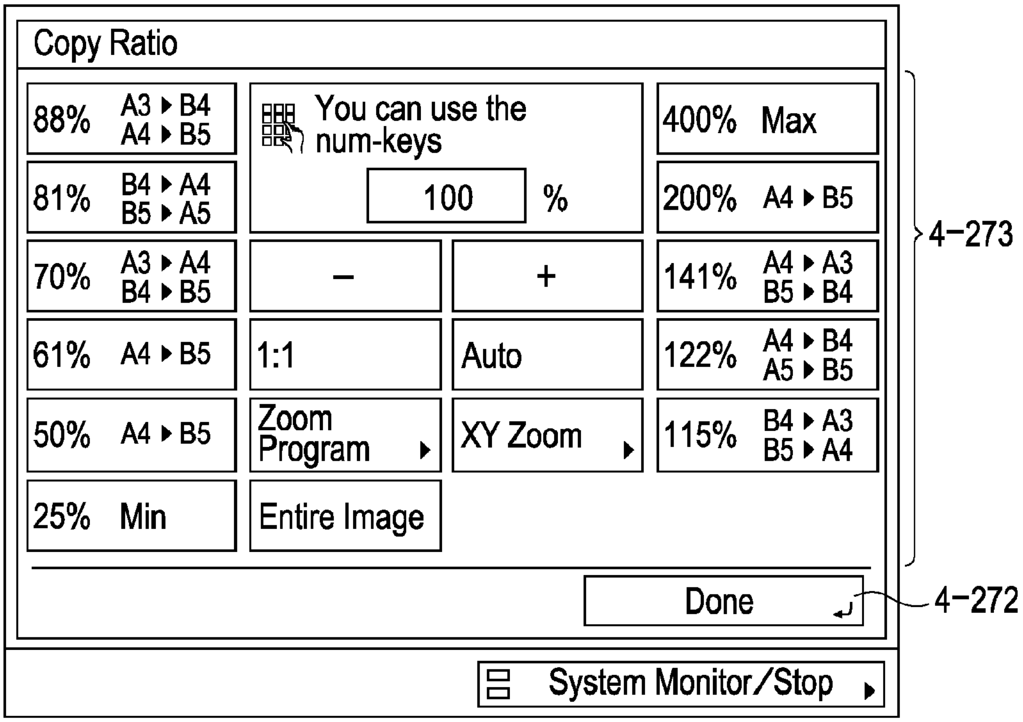

Keys 4-254 and 4-255 are used for setting 1:1 copying and reduction/enlargement copying, respectively. When the key 4-255 is pressed, the CPU 205 displays a copy ratio screen shown in FIG. 5B on the liquid crystal display 4-250 and allows the detailed setting of the reduction/enlargement copying. The copy ratio is selected through a key group 4-273 displayed on the copy ratio screen, and then a close key 4-272 is pressed by the user. Then, the CPU 205 closes this screen and displays the screen shown in FIG. 4 again. At this time, the CPU 205 displays the set ratio in a display field 4-251.

A key 4-257 is used for setting two-sided printing. When the key 4-257 is pressed, the CPU 205 displays a two-sided printing setting screen shown in FIG. 5C on the liquid crystal display 4-250. The settings of the two-sided printing will be described below with reference to FIG. 5C.

Figure 5C:
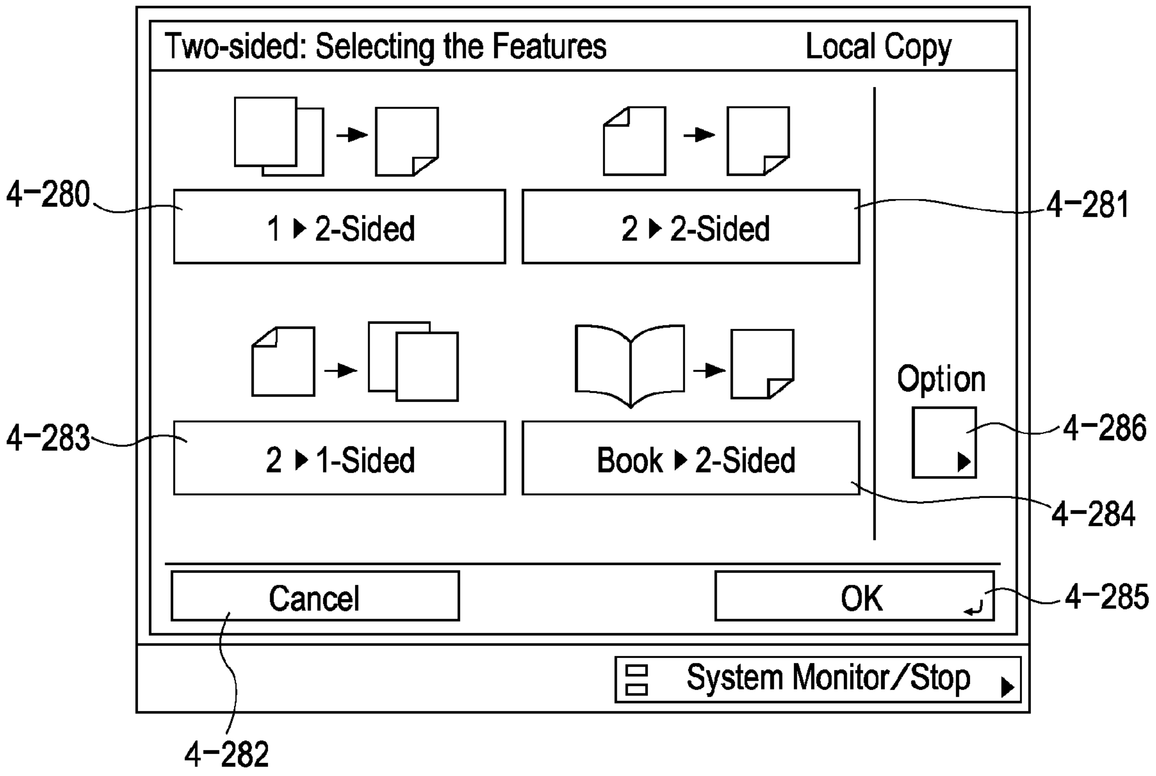

In FIG. 5C, a key 4-280 is a setting key used for selecting a printing process of printing on both sides of sheets using a document having images printed on one side of each sheet (hereinafter called one-sided document). A key 4-281 is a setting key used for selecting a printing process of printing on both sides of sheets using a document having images printed on both sides of each sheet (hereinafter called two-sided document). A key 4-283 is a setting key used for selecting a printing process of printing on only one side of each sheet using the two-sided document. A key 4-284 is a setting key used for selecting a printing process of printing on both sides of sheets using a book document.

A key 4-285 is used for enabling the settings made by the user on the two-sided printing setting screen shown in FIG. 5C. When this key is pressed, the CPU 205 enables the settings made on the two-sided printing setting screen shown in FIG. 5C and then displays the screen shown in FIG. 4 on the liquid crystal display 4-250 again. A key 4-282 is used for canceling the settings made on the screen shown in FIG. 5C. When this key is pressed, the CPU 205 disables the settings made on the two-sided printing setting screen shown in FIG. 5C and then displays the screen shown in FIG. 4 on the liquid crystal display 4-250 again.

A key 4-256 on the display screen shown in FIG. 4 is used for allowing the user to select one of the devices in the bookbinding system 2000 to which the paper (sheet) is to be conveyed after the printing process is performed by the printing apparatus 105.

Figure 7:
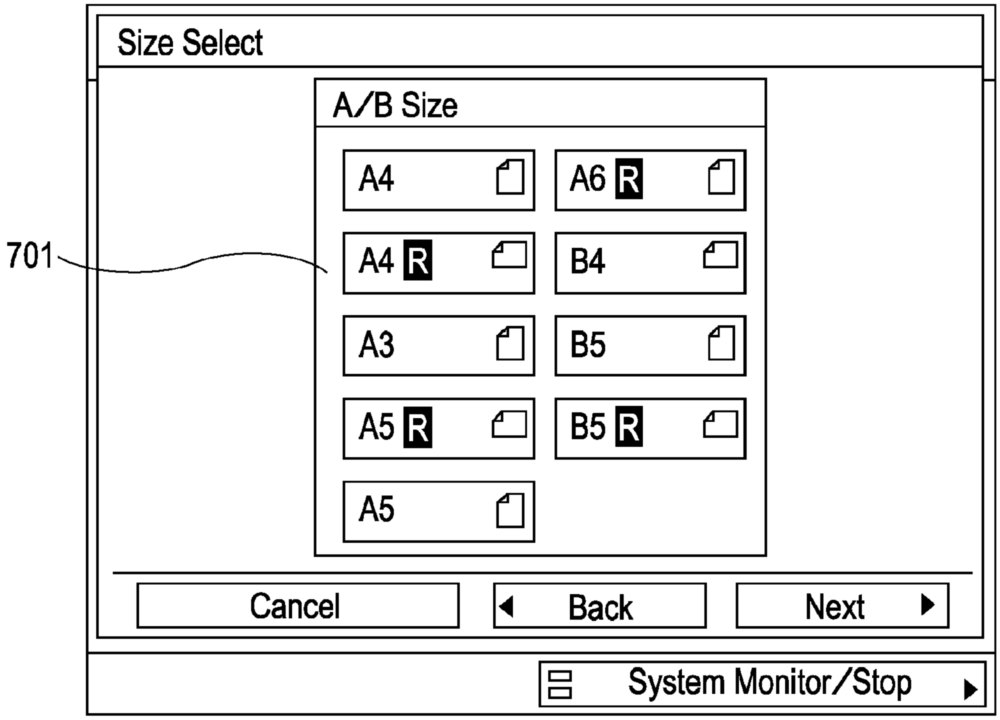
FIG. 7 is a diagram illustrating another operation screen displayed on the operation unit.

FIG. 7 is an operation screen used for designating the size of the sheets S stacked on a paper feed cassette (one of the cassettes 311 to 315). The operation screen shown in FIG. 7 is displayed after one of the paper feed cassettes (one of the cassettes 311 to 315) is selected on the screen shown in FIG. 5A. A key group 701 shown in FIG. 7 is used for allowing the user to set the size of the sheets S stacked on the cassette selected on the screen shown in FIG. 5A. When the user selects "A4" and then presses the "Next" key on the screen shown in FIG. 7, the CPU 205 displays an operation screen shown in FIG. 8 on the liquid crystal display 4-250.

Figure 8:
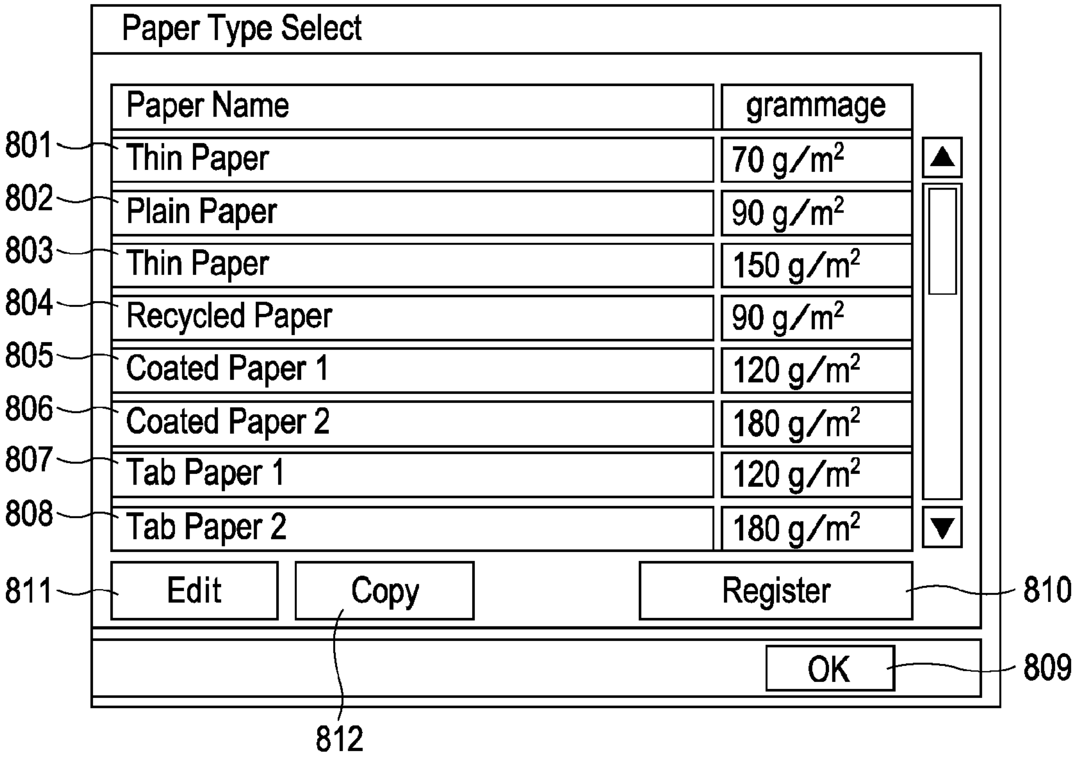
FIG. 8 is a diagram illustrating another operation screen displayed on the operation unit.

FIG. 8 illustrates a display screen shown on the operation unit 204 for setting the kind of paper placed on the paper feed tray.

In FIG. 8, the kind of the paper can be set by pressing one of keys 801 to 808. Then, when the user of the printing apparatus 105 presses a key 810, the kind of the paper is registered and the operation screen shown in FIG. 5A is displayed again.

Figures 13, 14:
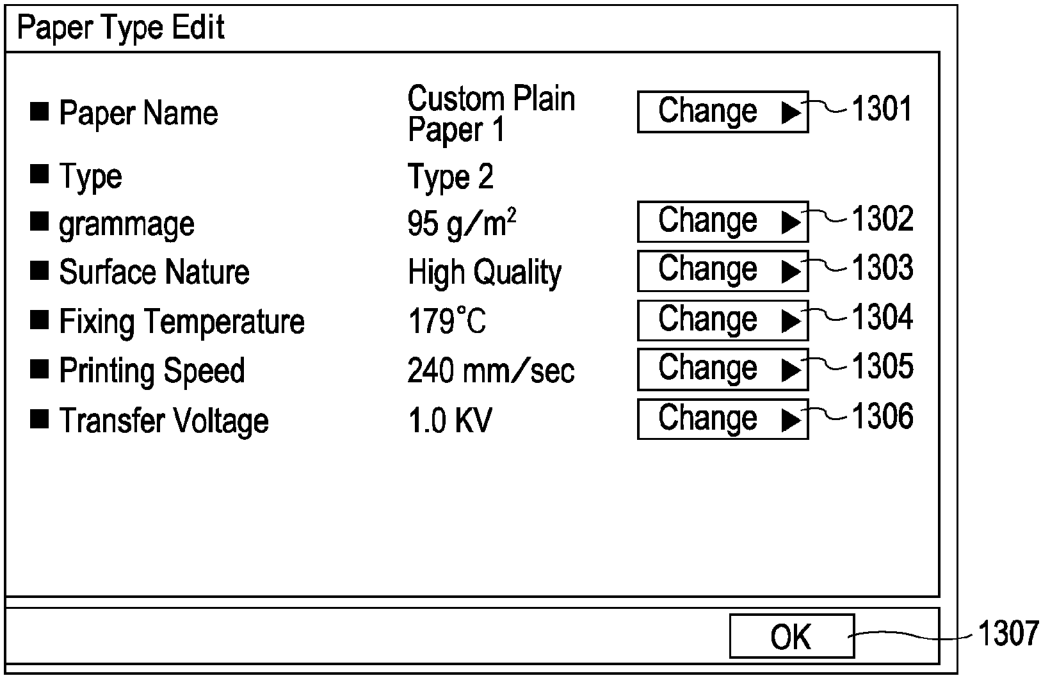
FIG. 13 is a diagram illustrating another operation screen displayed on the operation unit.
FIG. 14 is a diagram illustrating paper-feed-tray information.

In the above-described manner, one of the cassettes is selected in FIG. 5A, the size of the paper sheets stacked on the selected cassette is set in FIG. 7, and the kind of the paper sheets is set in FIG. 8. Then, the CPU 205 stores paper-feed-tray information representing a paper ID assigned to the paper sheets in association with the paper feed tray in the HDD 209. FIG. 14 shows an example of the paper-feed-tray information. When a printing process is executed for a print job received from the computer terminal 233, there may be a case in which only the paper feed tray (paper feed source) is designated in the print job generated by the computer terminal 233. In such a case, since the print job includes information designating the paper feed tray, the CPU 205 can determine the kind of the paper sheets used in the printing process by referring to the paper feed tray information shown in FIG. 14.

Next, paper information stored in the HDD 209 will be described below.

The printing apparatus 105 causes the printer unit 203 to perform the printing process on the basis of various operation information. The operation information is used for controlling the operation of each component of the printer unit 203. For example, the operation information includes a temperature set in a process of heating the fixing device 327, a transfer voltage applied by the transfer device 325, and a conveying speed at which the paper sheet is conveyed in the printer unit 203 (printing speed). The printing apparatus 105 can perform the printing process using various kinds of paper, and is demanded to print images with a uniform appearance irrespective of the kind of paper. Accordingly, in the printing apparatus 105, the paper information includes the operation information so that the transfer voltage, the printing speed, and the fixing temperature can be suitably controlled in accordance with the kind of paper. The operation information includes the fixing temperature information, the printing speed information, and the transfer voltage information, which will be described below. The operation information can, of course, include other kinds of information, such as information representing the pressing force applied to the sheet by the fixing device 327.

In the present embodiment, the paper information can be classified into three types: Type 1, Type 2, and Type 3.

First, the paper information of Type 1 will be described below.

The paper information of Type 1 is stored in the HDD 209 of the printing apparatus 105 in advance (for example, when the printing apparatus is manufactured). The paper information of Type 1 is stored in the form of a table shown in FIG. 9. In the table shown in FIG. 9, ID shows the information used for distinguishing between a plurality of kinds of paper of Type 1. The CPU 205 of the printing apparatus 105 determines the kind of paper by referring to ID. In addition, paper name shows the name of the paper, grammage shows the weight of the paper per square meters, surface nature shows the quality of the surface of the paper, and shape shows the peripheral shape of the paper. Since the grammage, the quality, and the shape of the paper are information showing the characteristics of the paper itself, these information will be called characteristic information in the following description. The characteristic information includes the shape information, the grammage information, and the quality information, which will be described below.

The fixing temperature is a temperature set in the process of heating the fixing device 327. The printing speed is a speed at which the paper sheet is conveyed in the printing process performed by the printer unit 203. The transfer voltage is a voltage applied to the paper sheet by the transfer device 325. The kinds of paper included in the paper information of Type 1 can be selected through the operation unit 204 of the printing apparatus 105 as the paper to be used in the printing process. More specifically, the kinds of paper included in the paper information of Type 1 can be selected on the operation screen shown in FIG. 8. In the example shown in FIG. 9, eight kinds of paper are registered as the paper of Type 1 in the HDD 209 of the printing apparatus 105. However, the number of kinds of paper is not limited to eight, and an arbitrary number of kinds of paper can be registered as Type 1 in advance.

Next, the paper information of Type 3 will be described below.

Similar to the paper information of Type 1, the paper information of Type 3 is also stored in the HDD 209 of the printing apparatus 105 in advance (for example, when the printing apparatus is manufactured). However, the paper information of Type 3 differs from that of Type 1 in that the kinds of paper included in the paper information of Type 3 cannot be selected on the operation screen shown in FIG. 8 as the paper to be used in the printing process performed by the printing apparatus 105. Therefore, initially, the paper included in the paper information of Type 3 cannot be used in the printing process performed by the printing apparatus 105. It becomes possible to use the paper included in the paper information of Type 3 only after the paper is registered in the paper information of Type 2, which will be described below. Although several thousand kinds of paper for use in the printing process are sold in the market, it is not practical to set the printing apparatus 105 such that the printing apparatus 105 can perform the printing process for all of the kinds of paper. For example, it is difficult to select a desired kind of paper from several thousand kinds of paper on the operation screen shown in FIG. 8. Therefore, among the paper included in the paper information of Type 3, the printing apparatus 105 registers only the kinds of paper required by the user of the printing apparatus 105 so that the registered kinds of paper can be used in the printing process.

More specifically, to make the paper included in the paper information of Type 3 usable in the printing process performed by the printing apparatus 105, the user of the printing apparatus 105 presses the paper register key 810 on the operation screen shown in FIG. 8. When the paper register key 810 is pressed, the CPU 205 displays an operation screen shown in FIG. 12 on the operation unit 204. In the operation screen shown in FIG. 12, the paper included in the information of Type 3 can be selected. In the example shown in FIG. 12, among the paper included in the paper information of Type 3, eight kinds of paper corresponding to IDs 0234-0000 to 0241-0000 are displayed in a selectable manner. When one of the fields (1201 to 1208) corresponding to the eight kinds of paper is pressed and then an OK key 1209 is pressed, the new kind of paper is registered in the paper information of Type 2 as one of the kinds of paper that can be selected in FIG. 8. Due to this registration process, a new kind of paper is registered (added) as the paper that can be used in the printing process performed by the printing apparatus 105. In the example shown in FIG. 12, eight kinds of paper included in the paper information of Type 3 are displayed in a selectable manner. However, the paper information of Type 3 includes a thousand kinds of paper as shown in FIG. 10. Therefore, in the screen shown in FIG. 12, one of the thousand kinds of paper can be selected by scrolling the paper information.

Next, the paper information of Type 2 will be described below.

Figure 12:
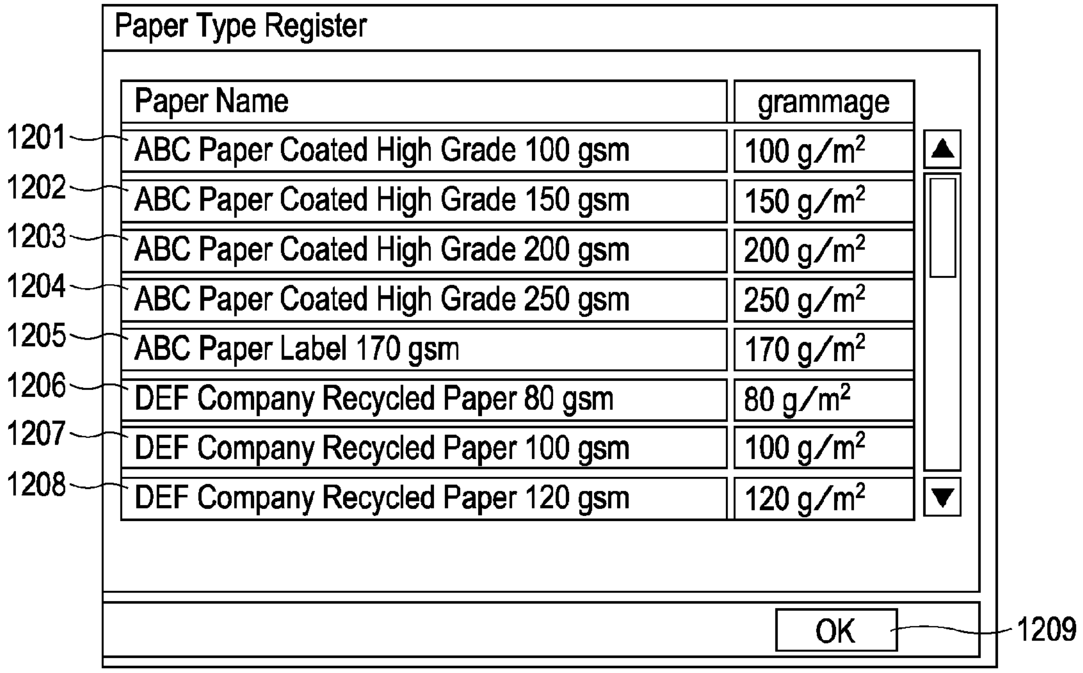
FIG. 12 is a diagram illustrating another operation screen displayed on the operation unit.

The paper included in the paper information of Type 2 is the paper included in the paper information of Type 3 and added as the paper that can be used in the printing process performed by the printing apparatus 105 as a result of the register process using the screen shown in FIG. 12. In addition, the paper included in the paper information of Type 1 can also be copied and registered as the paper included in the paper information of Type 2. In such a case, a copy key 812 is pressed while the paper included in the paper information of Type 1 is selected in the operation screen shown in FIG. 8. When the key 812 is pressed, the corresponding paper is added as the paper in the paper information of Type 2 independently of the paper information of Type 1. An example of the paper information of Type 2 is shown in FIG. 11. The paper added to the paper information of Type 2 by copying the paper included in the paper information of Type 1 has the same information as that of the paper included in the paper information of Type 1. However, the paper name is changed so as to prevent the same name from being used for both Type 1 and Type 2. The paper information of Type 2 can be edited by pressing an edit key 811 in FIG. 8. As an example, a case will be considered in which the paper information of the kind of paper corresponding to the ID 0002-0000 in the paper information of Type 1 shown in FIG. 9 is additionally registered (copied) as the paper information of Type 2. In this case, the key 802 is pressed and then the copy key 812 is pressed in FIG. 8, so that the new paper information is registered (copied) as the paper information of Type 2. Then, when the edit key 811 is pressed after the paper that is newly registered as the paper of Type 2 is selected in the screen shown in FIG. 8, an operation screen shown in FIG. 13 is displayed on the operation unit 204. Then, the user of the printing apparatus 105 can press a change key 1301 to display another screen (not shown) through which the user can input characters using the operation unit 204 to change the paper name information included in the paper information. In addition, the user of the printing apparatus 105 can also press a change key 1302 to display another screen (not shown) through which the user can input numerical values using the operation unit 204 to change the grammage information included in the paper information. In addition, the user of the printing apparatus 105 can also press a change key 1303 to display another screen (not shown) through which the user can perform a selecting process (selection between high quality, recycled, and coated) using the operation unit 204 to change the quality information included in the paper information. In addition, the user of the printing apparatus 105 can also press a change key 1304 to display another screen (not shown) through which the user can input numerical values using the operation unit 204 to change the fixing temperature information included in the paper information. In addition, the user of the printing apparatus 105 can also press a change key 1305 to display another screen (not shown) through which the user can input numerical values using the operation unit 204 to change the printing speed information included in the paper information. In addition, the user of the printing apparatus 105 can also press a change key 1306 to display another screen (not shown) through which the user can input numerical values using the operation unit 204 to change the transfer voltage information included in the paper information.

As described above, the paper information of Type 2 includes the operation information, such as the fixing temperature information, the printing speed information, and the transfer voltage information. These information can be arbitrarily changed by the user of the printing apparatus 105. By changing these information, the user of the printing apparatus 105 can suitably adjust the appearance (color, density, etc.) of the images printed on a certain kind of paper in the printing process.

In the above-described changing process, the CPU 205 updates the paper information of Type 2 stored in the HDD 209 on the basis of the information input through the operation unit 204. As a result of the above-described changing process, the operation unit 204 displays the paper information of both Type 1 and Type 2 as the paper that can be used in the printing process performed by the printing apparatus 105.

An operation of transmitting the paper information registered in the printing apparatus 234 to the printing apparatus 105 will be described below.

The printing apparatus 234 has a structure similar to that of the printing apparatus 105, and the paper information of Type 2 is also registered in the printing apparatus 234. In the case in which both the printing apparatus 234 and the printing apparatus 105 perform the printing process using the same document data and the same kind of paper, the printing apparatuses 234 and 105 are required to print images having a uniform appearance. To satisfy such a requirement, the paper information of Type 2 registered in the printing apparatus 234 is transmitted to the printing apparatus 105, so that the printing apparatus 234 and the printing apparatus 105 can perform the printing process using the same operation information. Thus, when the printing apparatus 234 and the printing apparatus 105 perform the printing process using the same document data and the same kind of paper, images having a uniform appearance can be printed.

The detailed procedure of the above-described operation will be described below.

Figure 15:
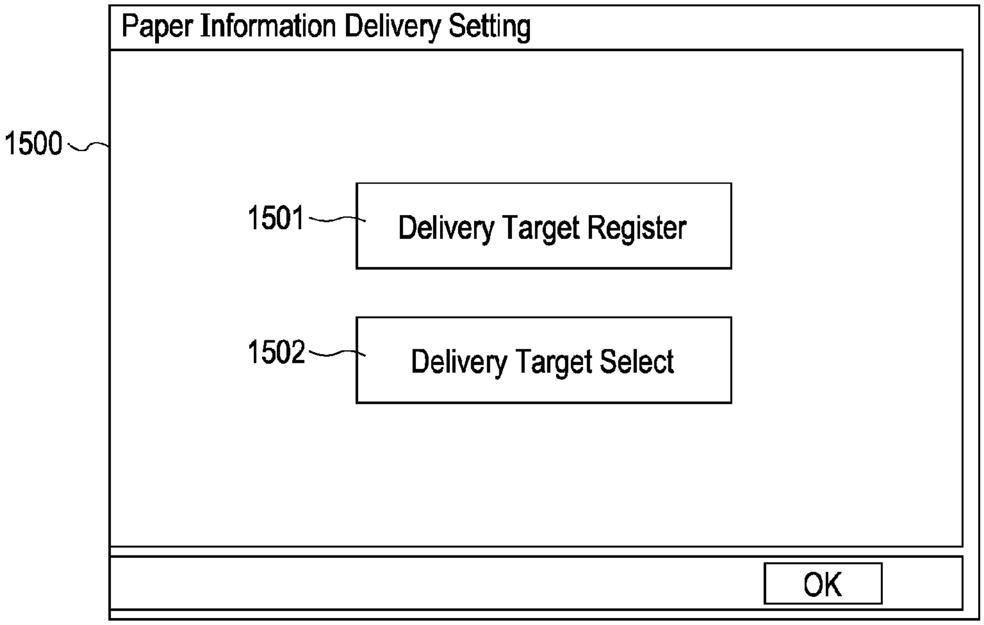
FIG. 15 is a diagram illustrating another operation screen displayed on the operation unit.

The user of the printing apparatus 234 presses a user mode key (not shown) on the operation unit, so that a display screen 1500 shown in FIG. 15 is displayed on the operation unit of the printing apparatus 234.

FIG. 15 shows the screen displayed on the operation unit of the printing apparatus 234. This screen is used for making various settings for transmitting (delivering) the paper information.

When the user of the printing apparatus 234 presses a button 1501 on the display screen 1500, a CPU controlling the printing apparatus 234 displays a delivery target register screen (not shown) for registering a target for delivery of the paper information on the operation unit. In the delivery target register screen, an IP address is input as information for identifying the printing apparatus to which the paper information is to be delivered. In addition, the name of the printing apparatus to which the paper information is to be delivered can also be input.

Figure 16:
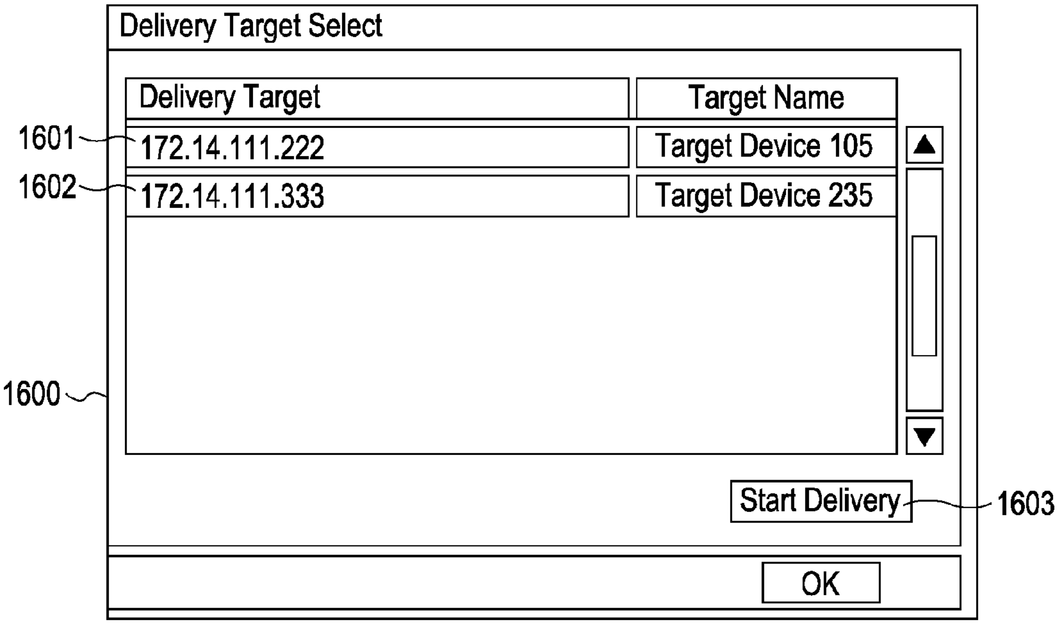
FIG. 16 is a diagram illustrating another operation screen displayed on the operation unit.

When the user of the printing apparatus 234 presses a button 1502 on the display screen 1500, the CPU controlling the printing apparatus 234 displays a delivery target select screen 1600 (see FIG. 16) for selecting a target for delivery of the paper information on the operation unit. In the delivery target select screen, a list of IP addresses are displayed as the information for identifying a plurality of printing apparatuses that can be selected as the delivery target. The user of the printing apparatus 234 selects a desired delivery target (1601 or 1602) from the list of delivery targets, and then presses a delivery start button 1603. Accordingly, the paper information is transmitted (delivered) to the printing apparatus selected as the delivery target. If the delivery start button 1603 is pressed while a plurality of delivery targets are selected, the paper information is simultaneously delivered to the selected delivery targets.

Next, an operation performed by the printing apparatus 105 when the printing apparatus 105 is selected as the delivery target of the paper information by the printing apparatus 234 or the printing apparatus 235 will be described below.

Figure 17:
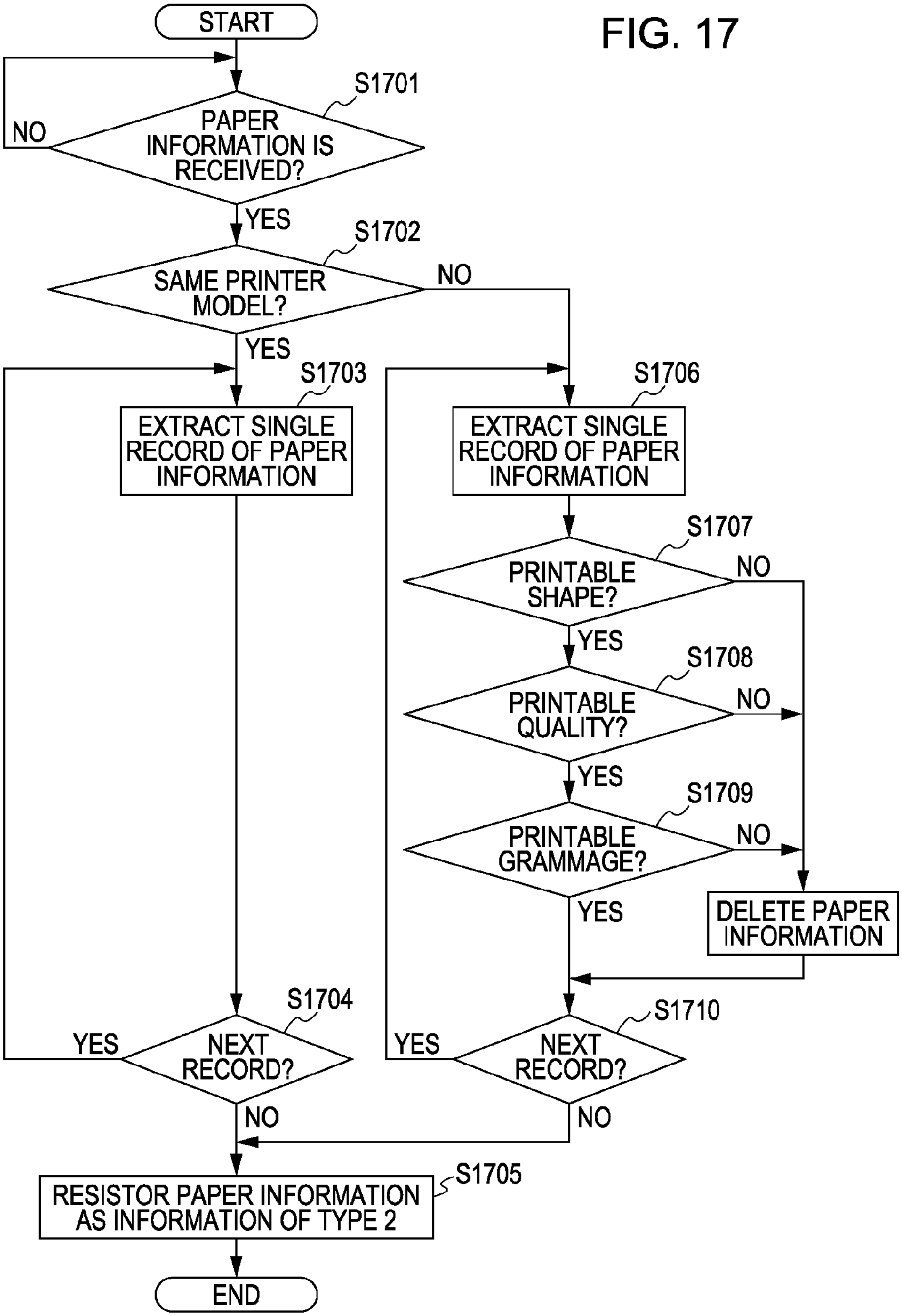
FIG. 17 is a flowchart of an operation executed when the printing apparatus receives paper information from another printing apparatus.

FIG. 17 is a flowchart of the operation performed when the printing apparatus 105 receives the paper information from the printing apparatus 234 or the printing apparatus 235. Each step of the flowchart shown in FIG. 17 is carried out by a program stored in ROM 207 being executed by the CPU 205, which causes transmission of commands to components of the printing apparatus 105.

In step S1701, the CPU 205 of the printing apparatus 105 determines whether or not the paper information is received from the printing apparatus 234 through the external I/F 202. If the CPU 205 determines that the paper information is received and stored in the HDD 209, the process proceeds to step S1702. If not, step S1701 is repeated. Even when the paper information is stored in the HDD 209, this does not mean that the paper corresponding to the paper information is registered as the paper that can be used in the printing process. To register the paper as the paper that can be used in the printing process, step S1705, which will be described below, must be executed.

In step S1702, the CPU 205 determines whether or not the kind of the printing apparatus 234 (or the printing apparatus 235) from which the paper information is delivered is the same as that of the printing apparatus 105. The determination of whether or not the printing apparatuses are of the same kind is performed on the basis of the following information. One of the information used for the determination is information for identifying the model of the printing apparatus 234 (or the printing apparatus 235) included in the paper information received from the printing apparatus 234 (or printing apparatus 235). Another information is information for identifying the model of the printing apparatus 105 that is stored in the ROM 207 of the printing apparatus 105. In this example, the printing apparatus 234 and the printing apparatus 105 are of the same model. Therefore, the information for identifying the model of the printing apparatus 234 is the same as the information for identifying the model of the printing apparatus 105. More specifically, "001" is included as the model ID in the paper information received from the printing apparatus 234, and the same model ID "001" is stored in the ROM 207 of the printing apparatus 105. Accordingly, in step S1702, the CPU 205 determines that the printing apparatus 234 and the printing apparatus 105 are of the same model. Therefore, the process proceeds to step S1703. In comparison, with regard to the printing apparatus 235, "002" is stored as the model ID in the paper information received from the printing apparatus 235, and is different from the model ID "001" stored in the ROM 207 of the printing apparatus 105. In this case, the CPU 205 determines that the printing apparatus 235 and the printing apparatus 105 are of different models at step S1702. Therefore, the process proceeds to step S1706.

As is clear from the following descriptions, the CPU 205 determines whether or not to use the operation information included in the paper information received from the printing apparatus 234 (or printing apparatus 235) in step S1702.

When the CPU 205 receives the paper information from the printing apparatus 234, the process proceeds to step S1703 from step S1702, and then step S1705 is executed. Accordingly, the received paper information is registered as the paper information of Type 2 without changing the operation information included in the paper information.

In comparison, when the CPU 205 receives the paper information from the printing apparatus 235, the process proceeds to step S1706 from step S1702, and then step S1705 is executed. Accordingly, the operation information included in the received paper information is not used, and paper information obtained by adding different paper information is registered as the paper information of Type 2.

In step S1703, the CPU 205 extracts a single record of paper information from the received paper information. Then, the process proceeds to step S1704. In step S1704, the CPU 205 determines whether or not there is other paper information remaining after the single record of paper information is extracted. If there is a next record, the process proceeds to step S1703. If not, the process proceeds to step S1705. In step S1705, the CPU 205 stores (registers) the paper information received from the printing apparatus 234 in the HDD 209 as the paper information of Type 2 in the printing apparatus 105.

In step S1706, the CPU 205 extracts a single record of paper information from the received paper information. Then, the process proceeds to step S1707.

In steps S1707 to S1710, the CPU 205 determines whether or not the paper information extracted in step S1706 can be used in the printing apparatus 105 by referring to a paper-information determination table shown in FIG. 18. The operation performed by the CPU 205 in steps S1707 to S1710 will be described below. In the following description of steps S1707 to S1710, a case is considered in which paper information shown in FIG. 19 is received from the printing apparatus 235.

In step S1707, the CPU 205 determines whether or not the paper having the shape indicated by the paper information extracted in step S1706 ("SSS Company Plain Paper" in FIG. 19) can be used by the printing apparatus 105. In this example, the CPU 205 confirms that the shape of the "SSS Company Plain Paper" is "Normal", and is included in the table shown in FIG. 18. Therefore, the process proceeds to step S1708.

In step S1708, the CPU 205 determines whether or not the paper having the quality (surface nature) indicated by the paper information extracted in step S1706 ("SSS Company Plain Paper" in FIG. 19) can be used by the printing apparatus 105. In this example, the CPU 205 confirms that the quality of the "SSS Company Plain Paper" is "High quality", and is included in the table shown in FIG. 18. Therefore, the process returns to step S1709.

In step S1709, the CPU 205 determines whether or not the paper with grammage indicted by the paper information extracted in step S1706 ("SSS Company Plain Paper" in FIG. 19) can be used by the printing apparatus 105. In this example, the CPU 205 confirms that the grammage of the "SSS Company Plain Paper" is "90 $g/m^2$", and is within the range "81 $g/m^2$ to 100 $g/m^2$" included the table shown in FIG. 18. Therefore, the process proceeds to step S1710.

In step S1710, the CPU 205 determines whether or not there is a next record. In this example, "SSS Company Heavy Paper" still remains in the paper information shown in FIG. 19. Therefore, the process proceeds to step S1706.

Accordingly, step S1706 and the following steps are performed for the "SSS Company Heavy Paper" in FIG. 19. In this example, the CPU 205 determines that paper with grammage indicated by the paper information of "SSS Company Heavy Paper" cannot be used by the printing apparatus 105 by referring to the paper-information determination table shown in FIG. 18. Therefore, the process proceeds from step S1709 to step S1711, and the CPU 205 deletes "SSS Company Heavy Paper" from the HDD 209 without additionally registering it as the paper information. After the deletion, the process proceeds to step S1710. In step S1710, the CPU 205 determines that there is "SSS Company Tab Paper" as a record of paper information after "SSS Company Heavy Paper". Therefore, the process returns to step S1706.

Then, step S1706 and the following steps are performed for the "SSS Company Tab Paper" in FIG. 19. The CPU 205 determines that the "SSS Company Tab Paper" can be used by the printing apparatus 105 from the paper-information determination table shown in FIG. 18.

Then, in step S1710, the CPU 205 determines that all of the three records included in the paper information received in step S1701 are extracted. Therefore, the process proceeds to step S1705.

When the process proceeds from step S1710 to step S1705, among the records of paper information extracted in step S1706, the CPU 205 registers the records of paper information that can be used in the printing apparatus 105 as the paper information of Type 2. In the paper information shown in FIG. 19, "SSS Company Plain Paper" and "SSS Company Heavy Paper" can be used in the printing apparatus 105. Therefore, the CPU 205 registers these two records in the HDD 209 as the paper information of Type 2. When the CPU 205 registers the two records in the HDD 209 as the paper information of Type 2, the received paper information can be registered without changing the operation information (the fixing temperature information, the printing speed information, and the transfer voltage information) included therein. However, other methods can also be used. For example, the paper-information determination table can be used for selecting suitable operation information corresponding to the paper information on the basis of three parameters including the shape, surface nature, and grammage included in the paper information. More specifically, for "SSS Company Plain Paper", the CPU 205 selects the operation information described below for the three parameters: shape="Normal", surface nature="High Quality", and grammage="90 $g/m^2$". That is, the CPU 205 selects 180° C. as the fixing temperature, 240 mm/sec as the printing speed, and 1.0 KV as the transfer voltage. Accordingly, when the CPU 205 registers "SSS Company Plain Paper" in the HDD 209 as the paper information of Type 2, the CPU 205 selects the following operation information. That is, the CPU 205 selects 180° C. as the fixing temperature, 240 mm/sec as the printing speed, and 1.0 KV as the transfer voltage. Similarly, for "SSS Company Tab Paper", the CPU 205 selects the operation information described below for the three parameters: shape="Tab", surface nature="Coated", and grammage="180 $g/m^2$". That is, the CPU 205 selects 195° C. as the fixing temperature, 180 mm/sec as the printing speed, and 1.3 KV as the transfer voltage. Accordingly, when the CPU 205 registers "SSS Company Tab Paper" in the HDD 209 as the paper information of Type 2, the CPU 205 selects the following operation information. That is, the CPU 205 selects 195° C. as the fixing temperature, 180 mm/sec as the printing speed, and 1.3 KV as the transfer voltage.

In the above-described example, the paper information extracted in step S1706 is registered as the paper information of Type 2 without changing the operation information included therein, or the operation information is registered using the paper-information determination table. However, other registering methods can also be used.

For example, paper of Type 1 that corresponds to each record of the paper information extracted in step S1706 can be determined using a paper-information determination table shown in FIG. 20. More specifically, the CPU 205 can determine the paper of Type 1 that corresponds to each record of paper information extracted in step S1706 on the basis of three parameters including the shape, surface nature, and grammage.

For example, with regard to "SSS Company Plain Paper" in FIG. 19, the CPU 205 determines that "SSS Company Plain Paper" corresponds to "Plain Paper" of Type 1. Then, the CPU 205 extracts 180° C. as the fixing temperature, 240 mm/sec as the printing speed, and 1.0 KV as the transfer voltage from the table shown in FIG. 9, and registers the extracted information in the HDD 209 as the operation information of the paper information.

In addition, for example, with regard to "SSS Company Tab Paper" in FIG. 19, the CPU 205 determines that "SSS Company Tab Paper" corresponds to "Coated Paper 1" of Type 1. Then, the CPU 205 extracts 184° C. as the fixing temperature, 180 mm/sec as the printing speed, and 1.2 KV as the transfer voltage from the table shown in FIG. 9, and registers the extracted information in the HDD 209 as the operation information of the paper information.

As described above, the first embodiment of the present invention provides a printing apparatus and a printing method in which, when the paper information including the operation information for setting the operating state of the printer unit 203 in the printing process is received from another apparatus, the paper information is registered after suitably determining whether or not the paper information is usable.

In addition, if the printing apparatus transmitting the paper information and the printing apparatus receiving the paper information are of the same kind, (that is, when the printing apparatuses are the printing apparatuses 105 and 234 in the present embodiment), the printing apparatuses can perform the printing process using the same operation information. In other words, if the printing apparatus 105 receives the paper information from the printing apparatus 234, the printing apparatus 105 can operate the printer unit 203 on the basis of the operation information included in the paper information received from the printing apparatus 234. More specifically, when the CPU 205 selects the paper information received from the printing apparatus 234 and registered in the HDD 209 to perform the printing process, the printer unit 203 is controlled using the operation information corresponding to the paper information. Therefore, in the case in which the printing apparatus 105 and the printing apparatus 234 perform the printing process based on the same document data received from the computer terminal 233, images with a uniform appearance can be printed.

Second Exemplary Embodiment

In the first embodiment, the printing apparatus 105 receives the paper information from the printing apparatus 234 (or printing apparatus 235) and registers the paper information after determining whether or not the paper information is usable.

In comparison, in the second embodiment, when the paper information is transmitted from a certain printing apparatus to another printing apparatus, the sender printing apparatus performs the following determination. That is, the sender printing apparatus determines whether to transmit the paper information including both the characteristic information representing the paper characteristics and the operation information or to transmit the paper information which includes only the characteristic information and which does not include the operation information depending on whether or not the receiver printing apparatus is of the same kind as the sender printing apparatus.

Figure 21:
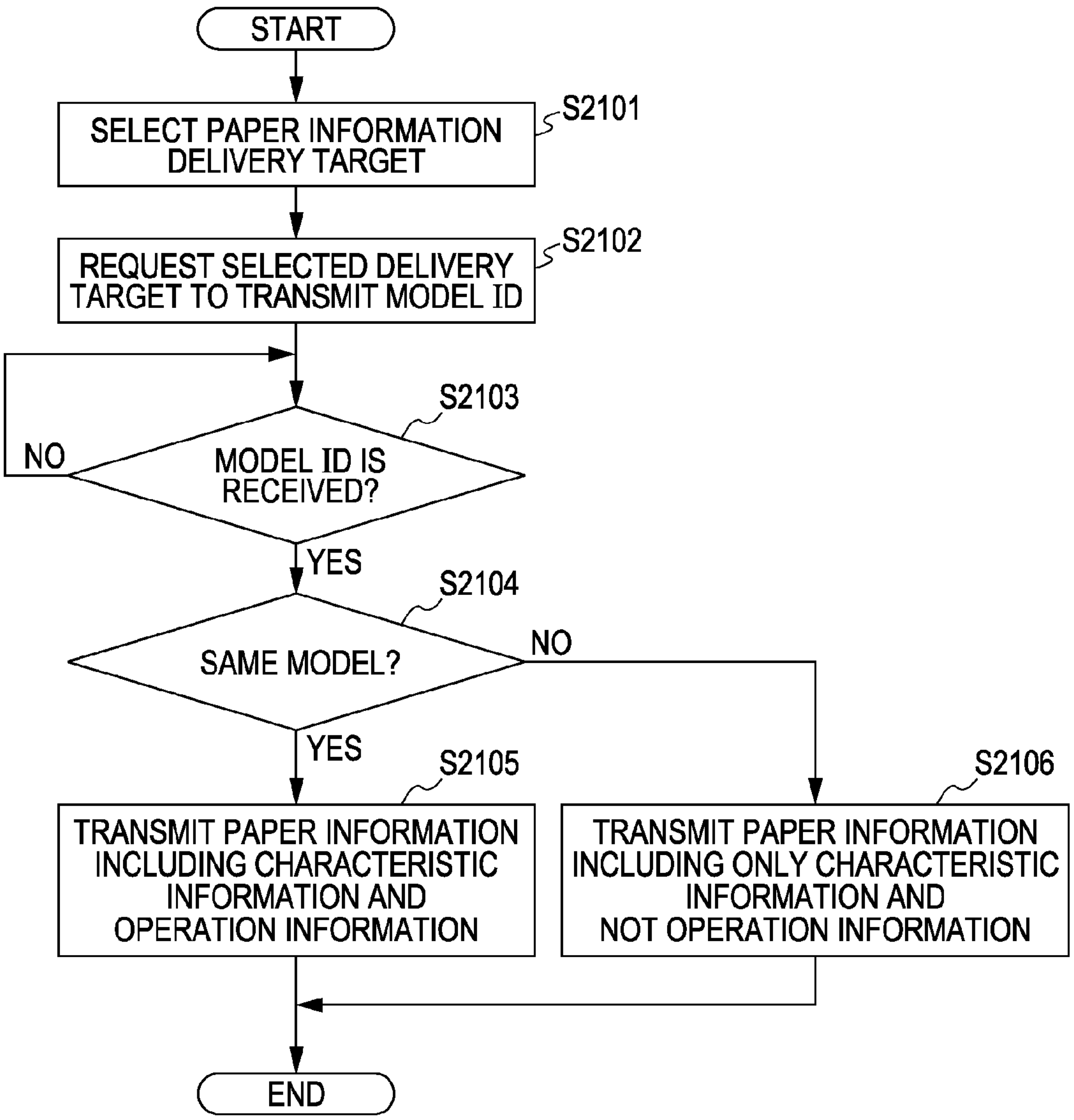
FIG. 21 is a flowchart of an operation executed by the printing apparatus when the printing apparatus transmits paper information to another printing apparatus.

An operation according to the second embodiment performed when the paper information is transmitted from the printing apparatus 105 to the printing apparatus 234 shown in FIG. 1 will be described below with reference to the flowchart shown in FIG. 21. FIG. 21 is a flowchart of the operation performed by a program stored in ROM 207 being executed by the CPU 205 when the printing apparatus 105 transmits the paper information to the printing apparatus 234. The structures of the printing apparatus 105 and the printing apparatus 234 according to the second embodiment are similar to those of the first embodiment.

Figure 22:
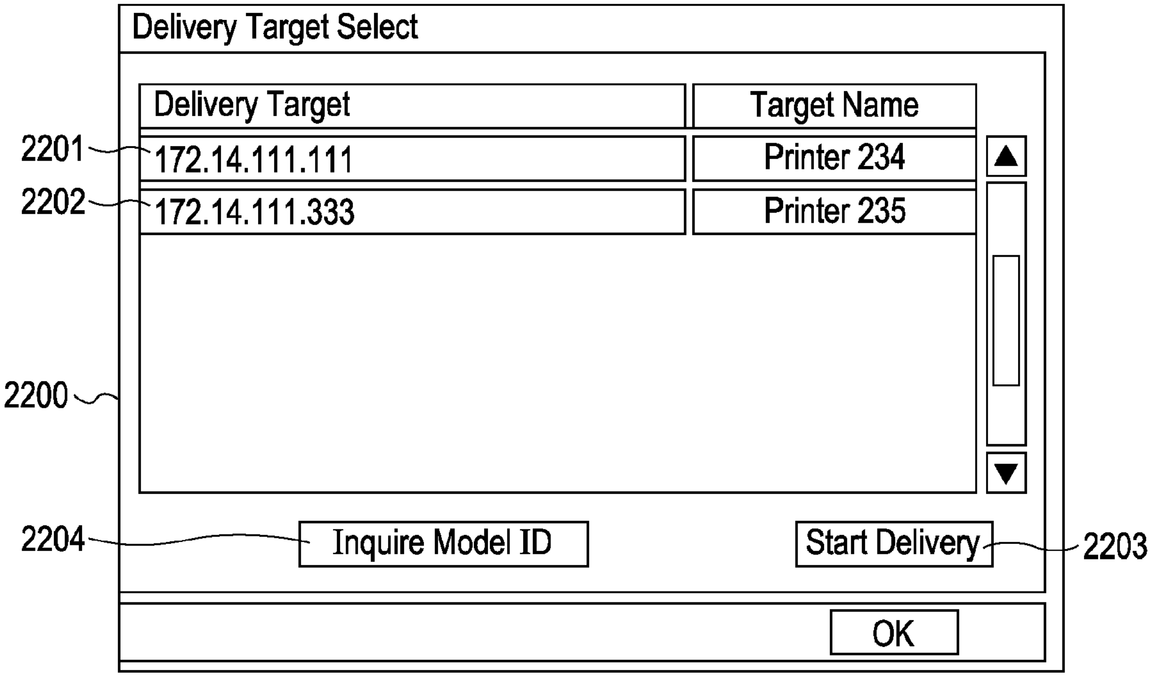
FIG. 22 is a diagram illustrating another operation screen displayed on the operation unit.

In step S2101, when the user of the printing apparatus 105 presses the button 1502 shown in FIG. 15, the CPU 205 displays a screen shown in FIG. 22. FIG. 22 is a screen used for selecting the delivery target of the paper information. The user of the printing apparatus 105 presses a button 2201 to select the printing apparatus 234 as the delivery target, and presses a button 2202 to select the printing apparatus 235 as the delivery target.

In step S2102, when it is detected that a button 2204 is pressed by the user of the printing apparatus 105 while the button 2201 and/or the button 2202 is/are being pressed, the CPU 205 requests the selected delivery target(s) to transmit the model ID thereof. If the printing apparatus 234 is selected as the delivery target of the paper information, the printing apparatus 105 requests the printing apparatus 234 to transmit the model ID thereof. When the printing apparatus 234 receives this request, the printing apparatus 234 transmits the model ID thereof (001) to the printing apparatus 105.

In step S2103, the CPU 205 determines whether or not the model ID is received from the printing apparatus 234 (or the printing apparatus 235). When the model ID is received, the process proceeds to step S2104.

In step S2104, the CPU 205 determines whether or not the model ID received from the printing apparatus 234 (or the printing apparatus 235) is the same as that of the printing apparatus 105. If the result of the determination is Yes, the process proceeds to step S2105. If not, the process proceeds to step S2106.

In the second embodiment, the model ID of the printing apparatus 234 is the same as that of the printing apparatus 105. Therefore, the CPU 205 executes step S2105 for the printing apparatus 234. However, the model ID of the printing apparatus 235 is different from that of the printing apparatus 105. Therefore, CPU 205 executes step S2106 for the printing apparatus 235.

In step S2105, the printing apparatus 234 to which the paper information is transmitted and the printing apparatus 105 are of the same kind. Therefore, the CPU 205 transmits the paper information including both the characteristic information and the operation information to the printing apparatus 234.

In step S2106, the printing apparatus 235 to which the paper information is transmitted and the printing apparatus 105 are of different kinds. Therefore, the CPU 205 transmits the paper information which includes only the characteristic information and which does not include the operation information (in which the operation information is deleted) to the printing apparatus 235.

The printing apparatus 234 receives the paper information including both the characteristic information and the operation information from the printing apparatus 105 and registers the received paper information as the paper information of Type 2. This step is similar to that described in the first embodiment.

The printing apparatus 235 receives the paper information which includes only the characteristic information and which does not include the operation information (in which the operation information is deleted) from the printing apparatus 105. Then, steps S1706 to S1710 shown in FIG. 17 are performed for the received paper information.

As described above, the second embodiment provides a printing apparatus and a printing method in which, when the paper information including the operation information for setting the operating state of the printer unit 203 in the printing process is transmitted to another printing apparatus, the following determination is performed. That is, it is determined whether to transmit the paper information including both the characteristic information representing the paper characteristic and the operation information or to transmit the paper information which includes only the characteristic information and which does not include the operation information depending on whether or not the receiver printing apparatus is of the same kind as the sender printing apparatus.

In addition, if the printing apparatus to which the paper information is transmitted is of a different model, the paper information which does not include the operation information is delivered. Therefore, the data size of the transmitted paper information can be reduced. As a result, the communication load can be reduced.

In addition, if the printing apparatus to which the paper information is transmitted is of a different model, the operation information is not transmitted. Therefore, malfunction of the printing apparatus which receives the paper information can be prevented.

Other Embodiments

In the first embodiment, if the paper information is received from a printing apparatus of a different kind and the paper having the characteristics indicated by the characteristic information included in the paper information is not usable in the printing apparatus, the paper information is deleted without being registered in the HDD 209. However, the present invention is not limited to this.

For example, in the case in which the paper information is received from a printing apparatus of a different model, even if the paper having the characteristics indicated by the characteristic information included in the paper information is not usable in the printing apparatus, the paper information can be stored in the HDD 209. However, if the paper having the characteristics indicated by the characteristic information included in the paper information is not usable in the printing apparatus, it is not preferable to perform the printing process using the paper having such characteristics. Therefore, if the paper having the characteristics indicated by the characteristic information included in the paper information is not usable in the printing apparatus, use of the paper in the printing process performed by the printing apparatus can be inhibited. For example, in the screen shown in FIG. 12 according to the first embodiment, selection of the corresponding button can be inhibited on the operation unit 204. As a method for inhibiting the selection of the corresponding button, the selection of the button can be simply disabled. Alternatively, a warning display can be shown when the corresponding button is selected.

In addition, in the first embodiment and the second embodiment, with regard to the operation information included in the paper information, the absolute value of the fixing temperature is provided as the fixing temperature information. However, other embodiments can also be obtained. For example, a reference value of the fixing temperature (for example, 180° C.) can be stored in the HDD 209 of the printing apparatus and a difference from the reference value (for example, 5° C. if the absolute value is 185° C.) can be provided as the fixing temperature information.

In addition, in the first embodiment and the second embodiment, with regard to the operation information included in the paper information, the absolute value of the printing speed is provided as the printing speed information. However, other embodiments can also be obtained. For example, a reference value of the printing speed (for example, 220 mm/sec) can be stored in the HDD 209 of the printing apparatus and a difference from the reference value (for example, 20 mm/sec if the absolute value is 240 mm/sec) can be provided as the fixing temperature information.

In addition, in the first embodiment and the second embodiment, with regard to the operation information included in the paper information, the absolute value of the transfer voltage is provided as the transfer voltage information. However, other embodiments can also be obtained. For example, a reference value of the transfer voltage (for example, 1.0 KV) can be stored in the HDD 209 of the printing apparatus and a difference from the reference value (for example, 0.3 KV if the absolute value is 1.3 KV) can be provided as the transfer voltage.

The features of the above-described embodiments can also be obtained by supplying a storage medium which stores a program code of a software for achieving the features of the above-described embodiments to a system or an apparatus. In such a case, a computer included in the system or the apparatus reads out and executes the program code stored in the storage medium to achieve the features of the above-described embodiments. In this case, the program code read from the storage medium itself realizes the features of the above-described embodiments, and the storage medium which stores the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-280155 filed Oct. 13, 2006, which is hereby incorporated by reference herein in its entirety.

What is claimed is:

1. A printing apparatus comprising:

a printing unit configured to perform a printing process of printing on paper on the basis of the print data;

a receiving unit configured to receive paper information and apparatus information from another printing apparatus, the paper information including operation information regarding operating conditions of the printing unit for use in the printing process using paper, the apparatus information identifying said other printing apparatus;

a first determining unit configured to determine, on the basis of the apparatus information received by the receiving unit, whether or not to enable use of the paper information;

a registering unit configured to enable use of the paper information by registering the paper information including the operation information if the first determining unit determines that the paper information should be enabled;

a selecting unit configured to select one of a plurality of pieces of the paper information registered by the registering unit; and a control unit configured to control the printing unit such that the printing unit performs the printing process using operating conditions based on the operation information included in the piece of the paper information selected by the selecting unit.

2. The printing apparatus according to claim 1, wherein the paper information received by the receiving unit includes the operation information and characteristic information representing characteristics of the paper used in the printing process.

3. The printing apparatus according to claim 2, further comprising a second determining unit configured to determine whether or not paper having the characteristics represented by the characteristic information included in the paper information received by the receiving unit is usable by the printing apparatus.

4. The printing apparatus according to claim 3, wherein, in the case that the first determining unit determines that use of the paper information should not be enabled and the second determining unit determines that the paper having the characteristics represented by the characteristic information is usable by the printing apparatus, the registering unit is configured to enable use of information obtained by excluding the operation information from the paper information.

5. The printing apparatus according to claim 4, further comprising:

a generating unit configured to generate new operation information on the basis of the characteristic information in the case that the first determining unit determines that use of the paper information should not be enabled, wherein, in the case that the first determining unit determines that use of the paper information should not be enabled, the registering unit is configured to enable use of the information obtained by attaching the new operation information to the paper information.

6. The printing apparatus according to claim 1, wherein, in the case that the printing apparatus and said other printing apparatus identified by the apparatus information are of the same kind, the first determining unit is configured to enable use of the paper information received from said another printing apparatus.

7. The printing apparatus according to claim 1, further comprising:

a storage unit configured to store the paper information received by the receiving unit; and an inhibiting unit configured to inhibit the selecting unit from selecting a piece of the paper information that is stored in the storage unit but whose use is not enabled by the registering unit.

8. The printing apparatus according to claim 1, wherein the printing unit includes a holding unit arranged to hold a developing-agent image corresponding to the print data; a transferring unit arranged to transfer the developing-agent image held by the holding unit onto a paper sheet; and a fixing unit arranged to heat and press the paper sheet onto which the developing-agent image is transferred by the transferring unit, and wherein the operation information includes information representing a pressing force applied to the paper sheet by the fixing unit.

9. The printing apparatus according to claim 1, wherein the printing unit includes a holding unit arranged to hold a developing-agent image corresponding to the print data; a transferring unit arranged to transfer the developing-agent image held by the holding unit onto a paper sheet; and a fixing unit arranged to heat and press the paper sheet onto which the developing-agent image is transferred by the transferring unit, and wherein the operation information includes information representing a fixing temperature applied to the paper sheet by the fixing unit.

10. The printing apparatus according to claim 1, wherein the printing unit includes a holding unit arranged to hold a developing-agent image corresponding to the print data; a transferring unit arranged to transfer the developing-agent image held by the holding unit onto a paper sheet; and a fixing unit arranged to heat and press the paper sheet onto which the developing-agent image is transferred by the transferring unit, and wherein the operation information includes information representing a transfer voltage applied to the paper sheet so as to transfer the developing-agent image onto the paper sheet.

11. A printing apparatus configured to transmit paper information to another printing apparatus, comprising:

a registering unit configured to enable use of the paper information, the paper information including characteristic information representing characteristics of paper used in the printing process and operation information regarding an operating state of a printing unit in the printing process using the paper; and a transmitting unit configured to perform one of a first transmitting process of transmitting the paper information including the characteristic information and the operation information to said other printing apparatus and a second transmitting process of transmitting paper information which includes the characteristic information and does not include the operation information to said other printing apparatus.

12. The printing apparatus according to claim 11 further comprising:

a printing unit configured to perform a printing process of printing paper on the basis of print data;

a selecting unit configured to select one of a plurality of pieces of the paper information registered by the registering unit;

a control unit configured to control the printing unit such that the printing unit performs the printing process using operating conditions based on the operation information included in the piece of the paper information selected by the selecting unit.

13. The printing apparatus according to claim 11, further comprising an apparatus determining unit configured to determine whether or not the printing apparatus and said another printing apparatus are of the same kind.

14. The printing apparatus according to claim 11, wherein the transmitting unit is configured to perform the first transmitting process if the apparatus determining unit determines that the printing apparatuses are of the same kind and configured to perform the second transmitting process if the apparatus determining unit determines that the printing apparatuses are of different kinds.

15. The printing apparatus according to claim 11, wherein the printing unit includes a holding unit arranged to hold a developing-agent image corresponding to the print data; a transferring unit arranged to transfer the developing-agent image held by the holding unit onto a paper sheet; and a fixing unit arranged to heat and press the paper sheet onto which the developing-agent image is transferred by the transferring unit, and wherein the operation information includes information representing a pressing force applied to the paper sheet by the fixing unit.

16. The printing apparatus according to claim 11, wherein the printing unit includes a holding unit arranged to hold a developing-agent image corresponding to the print data; a transferring unit arranged to transfer the developing-agent image held by the holding unit onto a paper sheet; and a fixing unit arranged to heat and press the paper sheet onto which the developing-agent image is transferred by the transferring unit, and wherein the operation information includes information representing a fixing temperature applied to the paper sheet by the fixing unit.

17. The printing apparatus according to claim 9, wherein the printing unit includes a holding unit arranged to hold a developing-agent image corresponding to the print data; a transferring unit arranged to transfer the developing-agent image held by the holding unit onto a paper sheet; and a fixing unit arranged to heat and press the paper sheet onto which the developing-agent image is transferred by the transferring unit, and wherein the operation information includes information representing a transfer voltage applied to the paper sheet so as to transfer the developing-agent image onto the paper sheet.

18. A printing method for a printing apparatus including a printing unit for performing a printing process of printing on a paper sheet, the printing method comprising:

receiving paper information and apparatus information from another printing apparatus, the paper information including operation information regarding operating conditions for use by the printing unit in the printing process using paper, the apparatus information identifying said another printing apparatus;

determining, on the basis of the received apparatus information, whether or not to enable use of the paper information received from said another printing apparatus;

enabling use of the paper information by registering the paper information including the operation information if the paper information is determined to be registered;

selecting one of a plurality of pieces of the registered paper information; and controlling the printing unit such that the printing unit performs the printing process according to operating conditions based on the operation information included in the selected piece of the paper information.

19. A method for a printing apparatus that transmits paper information to another printing apparatus, the method comprising:

selecting one of a plurality of pieces of paper information, which paper information includes characteristics information representing characteristics of paper used in the printing process and operation information regarding operating conditions for use by the printing unit during the printing process using paper; and performing one of a first transmitting process of transmitting the paper information including the characteristic information and the operation information to said other printing apparatus and a second transmitting process of transmitting paper information which includes the characteristic information and does not include the operation information to said other printing apparatus.

* * * * *